(12) United States Patent
Mizuno

(10) Patent No.: US 12,175,984 B2
(45) Date of Patent: Dec. 24, 2024

(54) INFORMATION TRANSMISSION DEVICE, INFORMATION RECEPTION DEVICE, INFORMATION TRANSMISSION METHOD, RECORDING MEDIUM, AND SYSTEM

(71) Applicant: Panasonic Intellectual Property Corporation of America, Torrance, CA (US)

(72) Inventor: Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 276 days.

(21) Appl. No.: 17/942,512

(22) Filed: Sep. 12, 2022

(65) Prior Publication Data

US 2023/0050621 A1 Feb. 16, 2023

Related U.S. Application Data

(63) Continuation of application No. PCT/JP2021/008536, filed on Mar. 4, 2021.
(Continued)

(30) Foreign Application Priority Data

Oct. 20, 2020 (JP) ................................. 2020-176116

(51) Int. Cl.
*G10L 17/18* (2013.01)
*G10L 15/00* (2013.01)
(Continued)

(52) U.S. Cl.
CPC .............. *G10L 17/18* (2013.01); *G10L 15/00* (2013.01); *G10L 15/02* (2013.01); *G10L 17/00* (2013.01)

(58) Field of Classification Search
CPC ......... G10L 17/18; G10L 17/02; G10L 17/20; G10L 25/48
See application file for complete search history.

(56) References Cited

U.S. PATENT DOCUMENTS 10,008,209 B1 6/2018 Qian et al.
2008/0195387 A1* 8/2008 Zigel ....................... G10L 17/06
704/E17.007
(Continued)

FOREIGN PATENT DOCUMENTS

JP 2019-110450 7/2019
JP 2020-60757 4/2020

OTHER PUBLICATIONS

International Search Report (ISR) issued on May 25, 2021 in International (PCT) Application No. PCT/JP2021/008536.
(Continued)

*Primary Examiner* — Linda Wong
(74) *Attorney, Agent, or Firm* — Wenderoth, Lind & Ponack, L.L.P.

(57) ABSTRACT

An information transmission device according to the present disclosure includes: an acoustic feature calculator that calculates an acoustic feature of a spoken voice; a speaker feature calculator that calculates a speaker feature from the acoustic feature using a deep neural network (DNN), the speaker feature being a feature unique to a speaker of the spoken voice; an analyzer that analyzes condition information indicating a condition to be used in calculating the speaker feature, based on the spoken voice; and an information transmitter that transmits the speaker feature and the condition information to an information reception device that performs speaker recognition processing on the spoken voice, as information to be used by the information reception device to recognize the speaker of the spoken voice.

12 Claims, 16 Drawing Sheets

Related U.S. Application Data

(60) Provisional application No. 62/990,069, filed on Mar. 16, 2020.

(51) Int. Cl.
 *G10L 15/02* (2006.01)
 *G10L 17/00* (2013.01)

(56) References Cited

U.S. PATENT DOCUMENTS

| | | | |
|---|---|---|---|
| 2020/0111496 A1 | 4/2020 | Itakura | |
| 2020/0258527 A1* | 8/2020 | Wang | G10L 17/04 |
| 2023/0317085 A1* | 10/2023 | Yamamoto | G10L 17/14 |
| | | | 704/249 |

OTHER PUBLICATIONS

Office Action issued May 24, 2024 in corresponding Chinese Patent Application No. 202180021012.0, with partial English translation.

* cited by examiner

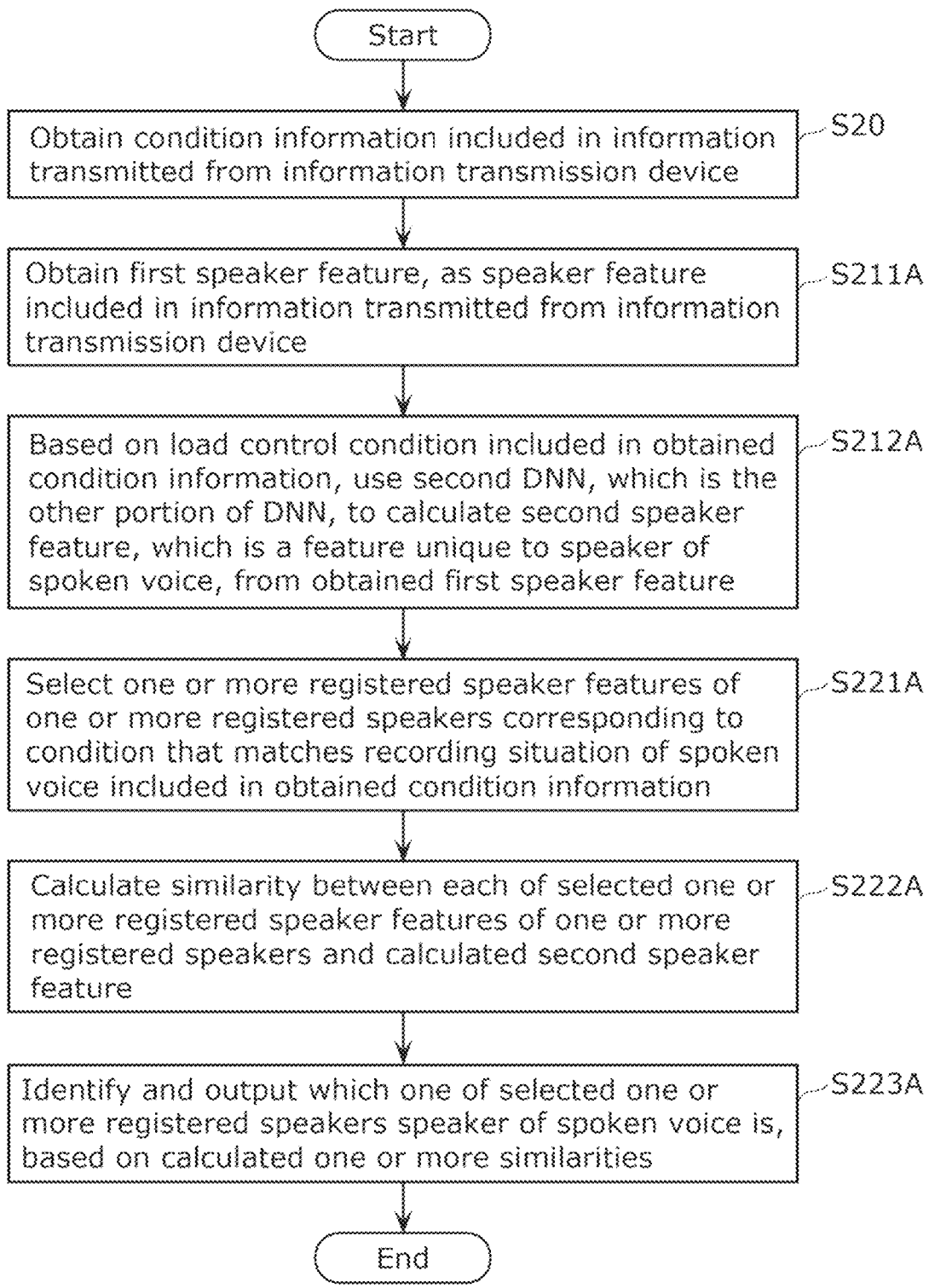

INFORMATION TRANSMISSION DEVICE, INFORMATION RECEPTION DEVICE, INFORMATION TRANSMISSION METHOD, RECORDING MEDIUM, AND SYSTEM

CROSS REFERENCE TO RELATED APPLICATIONS

This is a continuation application of PCT International Application No. PCT/JP2021/008536 filed on Mar. 4, 2021, designating the United States of America, which is based on and claims priority of U.S. Provisional Patent Application No. 62/990,069 filed on Mar. 16, 2020, and Japanese Patent Application No. 2020-176116 filed on Oct. 20, 2020. The entire disclosures of the above-identified applications, including the specifications, drawings, and claims are incorporated herein by reference in their entirety.

FIELD

The present disclosure relates to an information transmission device, an information reception device, an information transmission method, a recording medium, and a system.

BACKGROUND

There are teleconferencing systems, such as telephone conferencing systems, that allow two or more people to communicate by voice over a telephone line or a network.

When three or more people communicate by voice in a teleconferencing system, it may be desirable to display who is speaking, i.e., display who the speaker is.

For example, PTL 1 proposes a speaker recognition device that can accurately recognize a speaker even in a noisy environment by using a speaker recognition processing technique. Here, the speaker recognition technique is a technique that collects, in advance, the spoken voices of speakers to be registered, and based on similarities between features calculated from the collected spoken voices and a newly obtained spoken voice, which is to be subjected to speaker recognition, determines which of the registered speakers the speaker of the newly obtained spoken voice is.

CITATION LIST

Patent Literature

PTL 1: Japanese Unexamined Patent Application Publication No. 2020-60757

SUMMARY

Technical Problem

However, when the speaker recognition processing disclosed in PTL 1 is applied to a teleconferencing system like that described above, it is not applied to a device on the transmission side that transmits the speaker's spoken voice, but rather to a device on the reception side that receives the spoken voice. Accordingly, the device on the reception side needs to not only receive the spoken voice but perform the speaker recognition processing as well, which increases the computational load on the device on the reception side.

The present disclosure has been conceived in view of the above and has an object to provide an information transmission device, an information reception device, an information transmission method, a recording medium, and a system that can inhibit the computational load for performing the speaker recognition processing.

Solution to Problem

An information transmission device according to one aspect of the present disclosure includes: an acoustic feature calculator that calculates an acoustic feature of a spoken voice; a speaker feature calculator that calculates a speaker feature from the acoustic feature using a deep neural network (DNN), the speaker feature being a feature unique to a speaker of the spoken voice; an analyzer that analyzes condition information indicating a condition to be used in calculating the speaker feature, based on the spoken voice; and an information transmitter that transmits the speaker feature and the condition information to an information reception device that performs speaker recognition processing on the spoken voice, as information to be used by the information reception device to recognize the speaker of the spoken voice.

These general or specific aspects may be implemented as a system, a method, an integrated circuit, a computer program, or a computer-readable recording medium such as a CD-ROM, or any combination thereof.

Advantageous Effects

According to the information transmission device, for example, of the present disclosure, it is possible to inhibit the computational load for performing speaker recognition processing.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 17 is a flowchart illustrating operations performed by the information reception device according to Variation 1 in detail.

DESCRIPTION OF EMBODIMENTS

Figure 1:
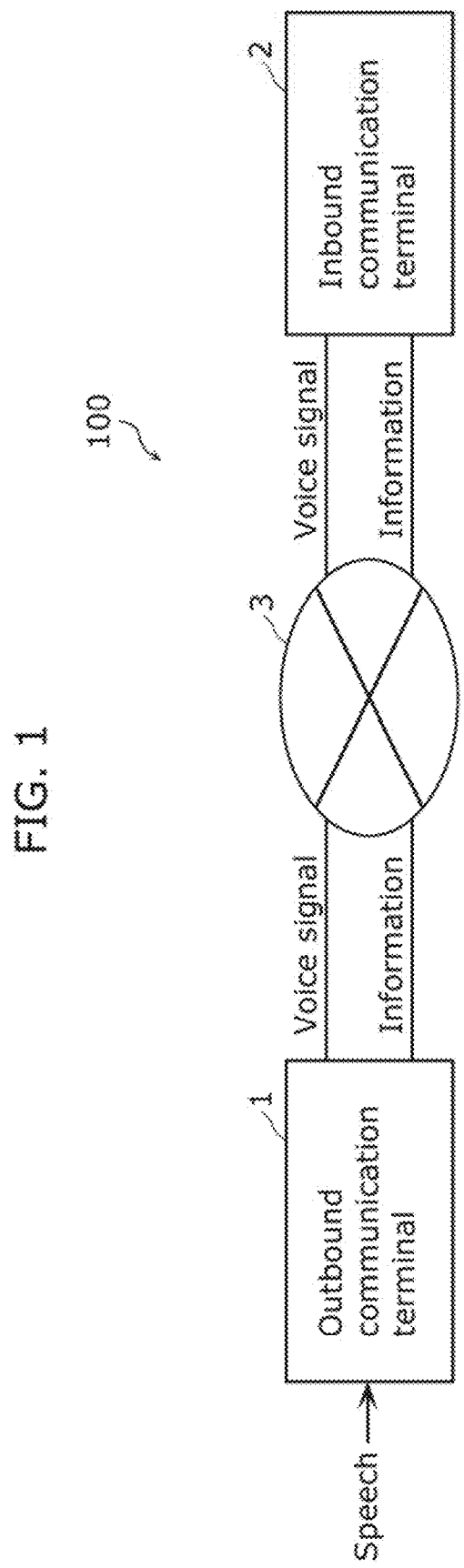
FIG. 1 is a block diagram illustrating an example of the configuration of a communication system according to an embodiment of the present disclosure.

Underlying Knowledge Forming the Basis of an Aspect of the Present Disclosure

When three or more people communicate by voice only in a teleconferencing system, it may be desirable to display who is speaking, i.e., display who the speaker is.

However, when, for example, the speaker recognition processing disclosed in PTL 1 is applied, it is not applied to a device on the transmission side that transmits the spoken voice of the speaker to be recognized, but rather to a device on the reception side that receives the spoken voice. Accordingly, the device on the reception side not only receives the spoken voice but also performs the speaker recognition processing.

The speaker recognition processing includes a process that calculates a speaker feature from an acoustic feature obtained from the spoken voice of the speaker to be recognized, and a process that compares the calculated speaker feature with stored registered speaker features and analyzes which registered speaker is closest to the calculated speaker feature. The processing that calculates the speaker feature requires a large amount of computation, and thus the computational burden for carrying out this processing is high. In the processing that analyzes which registered speaker is closest to the calculated speaker feature, if the calculated speaker feature of the spoken voice is not compared with the registered speaker features that match a condition of the recording of the spoken voice, it may result in an erroneous analysis. Furthermore, comparing the calculated speaker feature with each and every one of the stored registered speaker features is computationally burdensome.

The device on the reception side is therefore burdened with a high computational load. In view of this problem, the inventor came up with the idea of distributing the computational load of the speaker recognition processing by having the device on the transmission side that transmits the spoken voice perform a portion of the computation for the speaker recognition processing.

An information transmission device according to one aspect of the present disclosure includes: an acoustic feature calculator that calculates an acoustic feature of a spoken voice; a speaker feature calculator that calculates a speaker feature from the acoustic feature using a deep neural network (DNN), the speaker feature being a feature unique to a speaker of the spoken voice; an analyzer that analyzes condition information indicating a condition to be used in calculating the speaker feature, based on the spoken voice; and an information transmitter that transmits the speaker feature and the condition information to an information reception device that performs speaker recognition processing on the spoken voice, as information to be used by the information reception device to recognize the speaker of the spoken voice.

According to this aspect, by the information transmission device transmitting information to be used for recognizing the speaker of the spoken voice to the information reception device that performs the speaker recognition processing on the spoken voice, the information reception device can omit a portion of the computation for performing the speaker recognition processing. More specifically, since the information reception device can not only omit the calculation of the acoustic feature of the spoken voice of the speaker, but can omit at least a portion of the calculation of the speaker feature from the acoustic feature as well, the computational load for performing the speaker recognition processing can be reduced. Therefore, according to this aspect, it is possible to inhibit the computational load for performing speaker recognition processing.

For example, the analyzer may include: a situation analyzer that analyzes a recording situation of the spoken voice from the spoken voice; and a condition information setter that sets the recording situation as the condition information.

According to this aspect, by transmitting the analyzed recording situation of the spoken voice to the information reception device as the condition information, the information reception device can be caused select the registered speaker feature(s) corresponding to the recording situation and perform the similarity calculation processing accordingly. With this, since the information reception device does not need to perform the similarity calculation processing for each and every registered speaker feature under every condition, computational load can be reduced. Moreover, the information transmission device includes the speaker feature of the spoken voice of the speaker to be recognized in the information to be used for recognizing the speaker of the spoken voice, and transmits this information. With this, the information reception device can omit the calculation of the speaker feature of the spoken voice of the speaker to be recognized. Therefore, according to this aspect, it is possible to further inhibit the computational load for performing speaker recognition processing.

For example, the recording situation may indicate at least one of a noise level at a time of recording the spoken voice, a microphone used to record the spoken voice, or a data attribute of the spoken voice.

For example, the situation analyzer may further analyze a speaking duration of the spoken voice, based on the speaking duration, the condition information setter may further set, as the condition information, a load control condition indicating that the DNN to be used by the speaker feature calculator is a first DNN, the first DNN being a portion of the DNN, the first DNN including first through $n^{th}$ layers of the DNN, where n is a positive integer, and in accordance with the load control condition, the speaker feature calculator may calculate a first speaker feature from the acoustic feature as the speaker feature using the first DNN, the first speaker feature being a mid-calculation of the speaker feature.

According to this aspect, the first speaker feature, which corresponds to a portion of the speaker feature of the spoken voice of the speaker to be recognized, is included in information to be used for recognizing the speaker of the spoken voice, and this information is transmitted to the information reception device that performs the speaker recognition processing. This allows the information reception device to omit a portion of the computation for performing the speaker recognition processing. More specifically, by receiving this information, the information reception device can not only omit the calculation of the acoustic feature of the spoken voice of the speaker, but can omit a portion of the calculation of the speaker feature by using the first speaker feature as well. Moreover, when the information reception device receives the recording situation included in this information, since the information reception device can select the registered speaker feature(s) corresponding to this recording situation and perform the similarity computation processing accordingly, the computational load can be reduced.

Therefore, according to this aspect, it is possible to inhibit the computational load for performing speaker recognition processing.

For example, the analyzer may include: a situation analyzer that analyzes a speaking duration of the spoken voice; and a condition information setter that, based on the speaking duration, sets, as the condition information, a load control condition indicating that the DNN to be used by the speaker feature calculator is a first DNN, the first DNN being a portion of the DNN, the first DNN including first through $n^{th}$ layers of the DNN, where n is a positive integer, and in accordance with the load control condition, the speaker feature calculator may use the first DNN to calculate a first speaker feature from the acoustic feature as the speaker feature, the first speaker feature being a mid-calculation of the speaker feature.

According to this aspect, the first speaker feature, which corresponds to a portion of the speaker feature of the spoken voice of the speaker to be recognized, is included in information to be used for recognizing the speaker of the spoken voice, and this information is transmitted to the information reception device that performs the speaker recognition processing. This allows the information reception device to omit at least a portion of the computation for performing the speaker recognition processing. More specifically, by receiving this information, the information reception device can not only omit the calculation of the acoustic feature of the spoken voice of the speaker, but can omit a portion of the calculation of the speaker feature by using the first speaker feature as well.

Therefore, according to this aspect, it is possible to inhibit the computational load for performing speaker recognition processing.

The information reception device according to one aspect of the present disclosure includes: a storage in which one or more registered speaker features, which are features unique to respective one or more registered speakers who are registered in advance, are stored per condition used to calculate the one or more registered speaker features; a condition information obtainer that obtains the condition information included in the information transmitted from any one of the above-described information transmission devices; a speaker feature obtainer that obtains the speaker feature included in the information transmitted from the information transmission device; a similarity calculator that calculates, for each of the one or more registered speaker features stored in the storage, a similarity between the registered speaker feature and the speaker feature, based on the condition information obtained by the information obtainer and the speaker feature obtained by the speaker feature obtainer; and a speaker identifier that, based on the one or more similarities calculated by the similarity calculator, identifies and outputs which one of the one or more registered speakers stored in the storage the speaker of the spoken voice is.

According to this aspect, the information reception device that performs the speaker recognition processing on the spoken voice receives information to be used for recognizing the speaker of the spoken voice, which makes it possible to omit at least a portion of the computation for performing the speaker recognition processing. More specifically, since the information reception device can not only omit the calculation of the acoustic feature of the spoken voice of the speaker, but can omit at least a portion of the calculation of the speaker feature from the acoustic feature as well, the computational load for performing the speaker recognition processing can be reduced.

Therefore, according to this aspect, it is possible to reduce the computational load for performing speaker recognition processing.

For example, the similarity calculator may include: a selector that, when the condition information obtained by the condition information obtainer includes a recording situation of the spoken voice, selects the one or more registered speaker features of the one or more registered speakers that correspond to a condition that matches the recording situation; and a similarity calculation processor that calculates, for each of the one or more registered speaker features selected by the selector, a similarity between the registered speaker feature and the speaker feature obtained by the speaker feature obtainer. Based on the one or more similarities calculated by the similarity calculation processor, the speaker identifier may identify and outputs which one of the one or more registered speakers selected by the selector the speaker of the spoken voice is.

According to this aspect, the information reception device obtains the recording situation of the spoken voice included in the received condition information, and therefore selects the registered speaker feature(s) corresponding to the recording situation and performs the similarity computation processing accordingly. With this, since the information reception device does not need to perform the similarity calculation processing for each and every registered speaker feature under every condition, computational load can be reduced. Moreover, by the information reception device receiving the speaker feature of the spoken voice of the speaker to be recognized, the information reception device can omit calculations for the speaker feature of the spoken voice of the speaker to be recognized. Therefore, according to this aspect, it is possible to further inhibit the computational load for performing speaker recognition processing.

For example, when the condition information obtained by the condition information obtainer further includes a load control condition indicating that a first DNN is used instead of the DNN, the condition information obtainer may transmit the load control condition to the speaker feature obtainer, the first DNN being a portion of the DNN, the first DNN including first through $n^{th}$ layers of the DNN, where n is a positive integer, and the speaker feature obtainer may obtain a first speaker feature calculated using the first DNN as the speaker feature included in the information, and if the speaker feature obtainer has received the load control condition, may calculate, based on the load control condition, a second speaker feature from the first speaker feature using a second DNN, the first speaker feature being a mid-calculation of the speaker feature, the second speaker feature being the speaker feature, the second DNN being a portion of the DNN, the second DNN including $n+1^{th}$ through final layers of the DNN.

According to this aspect, the information reception device obtains the first speaker feature, which corresponds to a portion of the speaker feature of the spoken voice of the speaker to be recognized, whereby the information reception device can omit a portion of the computation for performing the speaker recognition processing. More specifically, by receiving the first speaker feature, the information reception device can not only omit the calculation of the acoustic feature of the spoken voice of the speaker, but can omit a portion of the calculation of the speaker feature by using the first speaker feature as well. Moreover, when the information reception device receives the recording situation included in this information, since the information reception device can select the registered speaker feature(s) corresponding to this recording situation and perform the similarity computation processing accordingly, the computational load can be reduced.

Therefore, according to this aspect, it is possible to inhibit the computational load for performing speaker recognition processing.

For example, when the condition information obtained by the condition information obtainer indicates a load control condition indicating that a first DNN is used instead of the DNN, the condition information obtainer may transmit the load control condition to the speaker feature obtainer, the first DNN being a portion of the DNN, the first DNN including first through $n^{th}$ layers of the DNN, where n is a positive integer, and the speaker feature obtainer may obtain a first speaker feature calculated using the first DNN as the speaker feature included in the information, and if the speaker feature obtainer has received the load control condition, may calculate, based on the load control condition, a second speaker feature from the first speaker feature using a second DNN, the first speaker feature being a mid-calculation of the speaker feature, the second speaker feature being the speaker feature, the second DNN being a portion of the DNN, the second DNN including $n+1^{th}$ through final layers of the DNN.

According to this aspect, the information reception device obtains the first speaker feature, which corresponds to a portion of the speaker feature of the spoken voice of the speaker to be recognized, whereby the information reception device can omit a portion of the computation for performing the speaker recognition processing. More specifically, by receiving the first speaker feature, the information reception device can not only omit the calculation of the acoustic feature of the spoken voice of the speaker, but can omit a portion of the calculation of the speaker feature by using the first speaker feature as well. Therefore, according to this aspect, it is possible to inhibit the computational load for performing speaker recognition processing.

An information transmission method according to one aspect of the present disclosure is performed by a computer, and includes: calculating an acoustic feature of a spoken voice; calculating a speaker feature from the acoustic feature using a deep neural network (DNN), the speaker feature being a feature unique to a speaker of the spoken voice; analyzing condition information indicating a condition to be used in calculating the speaker feature, based on the spoken voice; and transmitting the speaker feature and the condition information to an information reception device that performs speaker recognition processing on the spoken voice, as information to be used by the information reception device to recognize the speaker of the spoken voice.

A system according to one aspect of the present disclosure includes an information transmission device and an information reception device that performs speaker recognition processing. The information transmission device includes: an acoustic feature calculator that calculates an acoustic feature of a spoken voice; a speaker feature calculator that uses a deep neural network (DNN) to calculate a speaker feature from the acoustic feature, the speaker feature being a feature that can identify a speaker of the spoken voice; an analyzer that analyzes condition information indicating a condition to be used in calculating the speaker feature, based on the spoken voice; and an information transmitter that transmits the speaker feature and the condition information to the information reception device that recognizes the speaker of the spoken voice, as information to be used by the information reception device to recognize the speaker of the spoken voice. The information reception device includes: a storage in which one or more registered speaker features, which are features unique to respective one or more registered speakers who are registered in advance, are stored per condition used to calculate the one or more registered speaker features; a condition information obtainer that obtains the condition information included in the information transmitted from the information transmission device; a speaker feature obtainer that obtains the speaker feature included in the information transmitted from the information transmission device; a similarity calculator that calculates, for each the one or more registered speaker features stored in the storage, a similarity between the registered speaker feature and the speaker feature, based on the condition information obtained by the information obtainer and the speaker feature obtained by the speaker feature obtainer; and a speaker identifier that, based on the one or more similarities calculated by the similarity calculator, identifies and outputs which one of the one or more registered speakers stored in the storage the speaker of the spoken voice is.

These general or specific aspects may be implemented as a system, a method, an integrated circuit, a computer program, or a computer-readable recording medium such as a CD-ROM, or any combination thereof.

Hereinafter, embodiments of the present disclosure will be described with reference to the drawings. Each embodiment described below shows a specific example of the present disclosure. The numerical values, shapes, elements, steps, order of the steps, etc., indicated in the following embodiments are mere examples, and therefore do not intend to limit the present disclosure. Accordingly, among elements in the following embodiments, those not recited in any of the broadest, independent claims are described as optional elements. Moreover, content from one embodiment may be combined with content from any other embodiment.

Embodiment

Hereinafter, the information transmission device and the like according to an embodiment and variations thereof will be described with reference to the drawings.

1.1 Communication System 100

FIG. 1 is a block diagram illustrating an example of the configuration of communication system 100 according to the present embodiment.

Communication system 100 according to the present embodiment is a teleconferencing system that allows two or more people to communicate by voice, and is used in, for example, a telephone conferencing system.

Communication system 100 includes outbound communication terminal 1 and inbound communication terminal 2, as illustrated in FIG. 1. These are connected via network 3, such as a telephone line, a local area network (LAN), or the internet.

1.2 Configuration of Outbound Communication Terminal 1 and Inbound Communication Terminal 2

Figure 2:
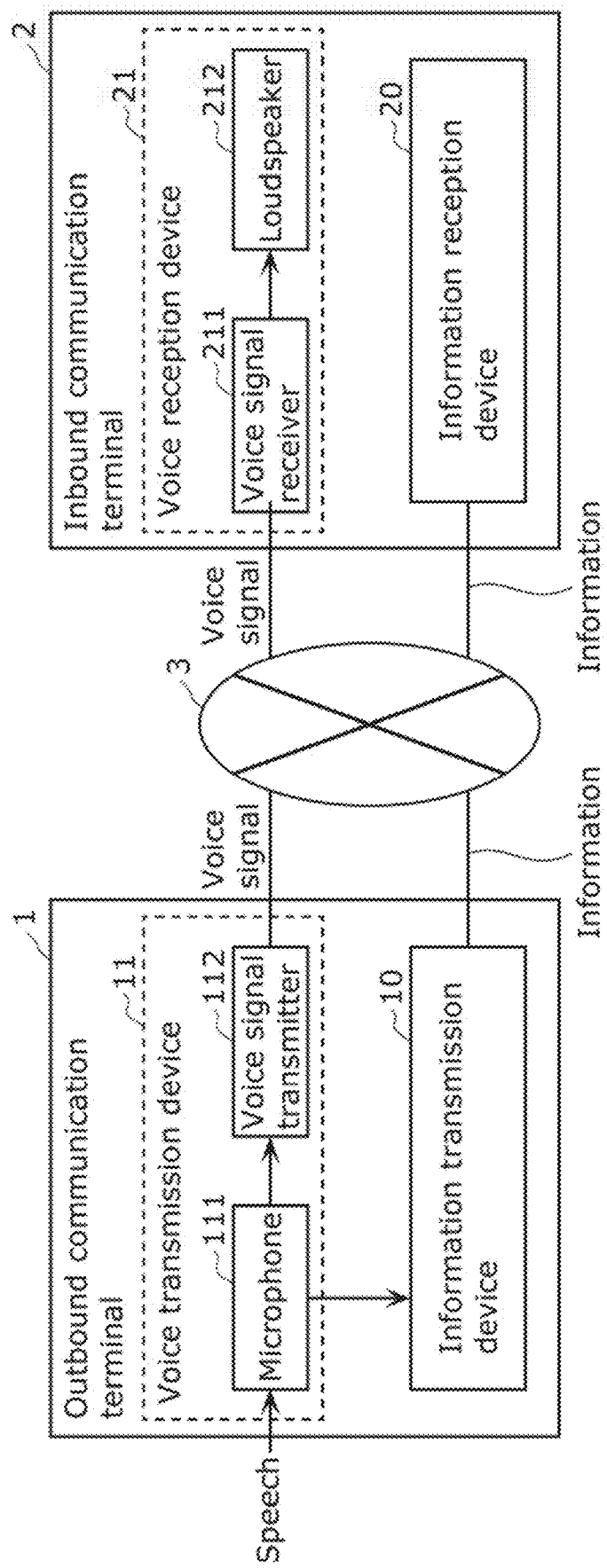
FIG. 2 is a block diagram illustrating an example of the configuration of the outbound communication terminal and the inbound communication terminal illustrated in FIG. 1.

FIG. 2 is a block diagram illustrating an example of the configuration of outbound communication terminal 1 and inbound communication terminal 2 illustrated in FIG. 1.

Outbound communication terminal 1 is used by the caller, i.e., the speaker, and when the speaker speaks, a voice signal of the speech and information obtained from the spoken voice are sent to inbound communication terminal 2 via network 3.

As illustrated in FIG. 2, outbound communication terminal 1 includes information transmission device 10 that transmits this information and voice transmission device 11 that transmits the voice signal of the speech. Here, voice transmission device 11 includes microphone 111 that receives an input of the speaker's speech and outputs the voice signal of the spoken voice, and voice signal transmitter 112 that transmits the voice signal received from microphone 111 to inbound communication terminal 2 via network 3. Information transmission device 10 will be described later.

Inbound communication terminal 2 is used by the listener of the speech of the speaker on the calling side, i.e., by the receiver, and receives the voice signal of the speech spoken by the speaker and information obtained from the spoken voice, which are transmitted by outbound communication terminal 1 via network 3.

As illustrated in FIG. 2, inbound communication terminal 2 includes information reception device 20 that receives this information and voice reception device 21 that receives the voice signal of the speech spoken by the speaker on the calling side. Here, voice reception device 21 includes voice signal receiver 211 that receives a voice signal of spoken voice transmitted by outbound communication terminal 1 via network 3, and loudspeaker 212 that outputs spoken voice from the voice signal of the spoken voice received from voice signal receiver 211. Information reception device 20 will be described later.

1.3 Detailed Configuration of Information Transmission Device 10 and Information Reception Device 20

Figure 3:
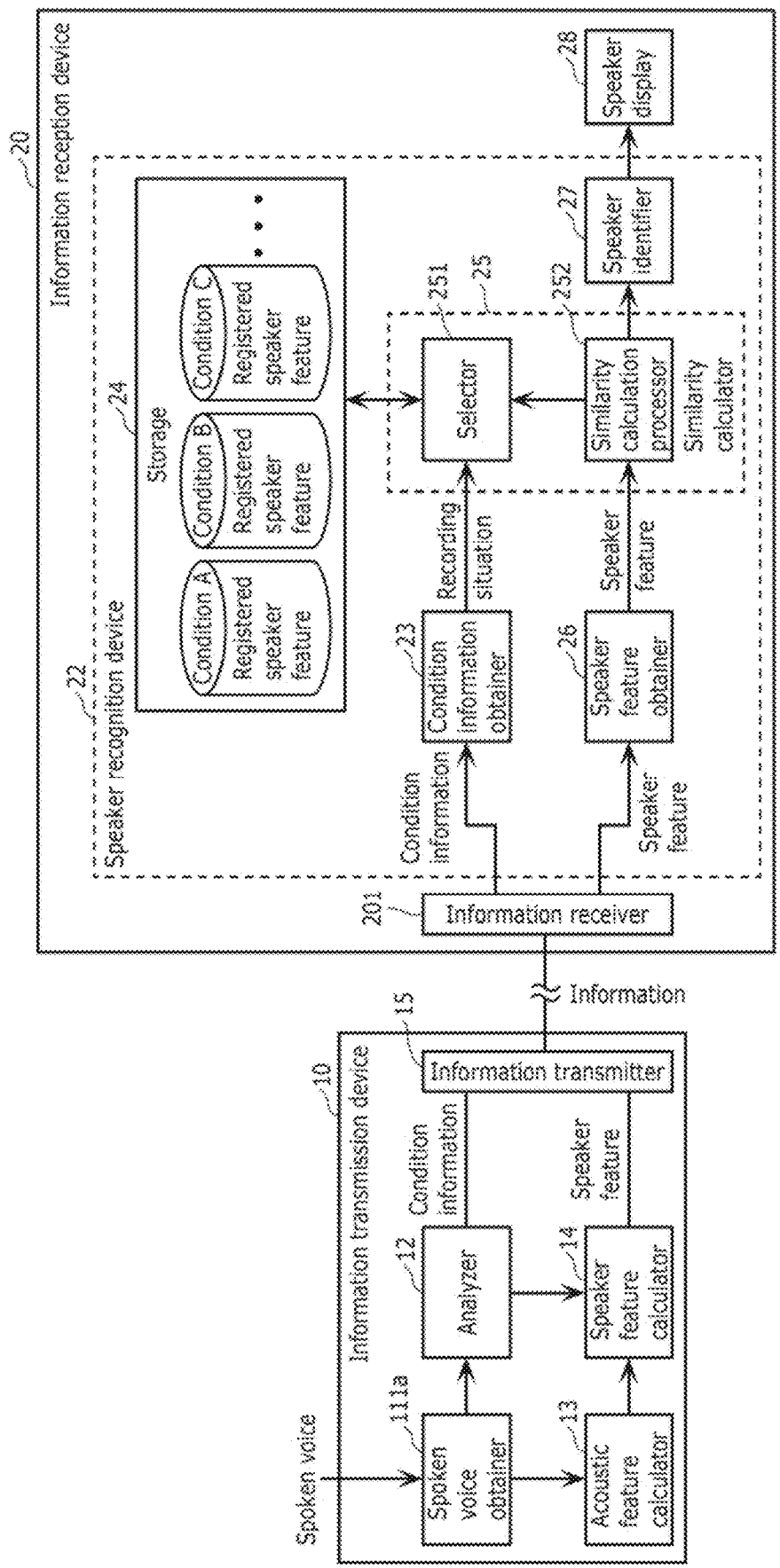
FIG. 3 is a block diagram illustrating an example of the configuration of the information transmission device and the information reception device illustrated in FIG. 2 in greater detail.

FIG. 3 is a block diagram illustrating an example of the configuration of information transmission device 10 and information reception device 20 illustrated in FIG. 2 in greater detail.

1.3.1 Information Transmission Device 10

Information transmission device 10 is realized by a computer including, for example, a processor (microprocessor), memory, and a communication interface, etc., and handles a portion of the computation necessary for information reception device 20 to perform the speaker recognition processing. As illustrated in FIG. 3, information transmission device 10 includes spoken voice obtainer 111a, analyzer 12, acoustic feature calculator 13, speaker feature calculator 14, and information transmitter 15. Next, each element will be described.

1.3.1.1 Spoken Voice Obtainer 111a

Spoken voice obtainer 111a obtains the speaker's spoken voice. In the present embodiment, spoken voice obtainer 111a obtains the voice signal of the spoken voice from microphone 111 and outputs the voice signal to analyzer 12 and acoustic feature calculator 13. Spoken voice obtainer 111a and microphone 111 may be the same element or different elements.

1.3.1.2 Analyzer 12

Figure 4:
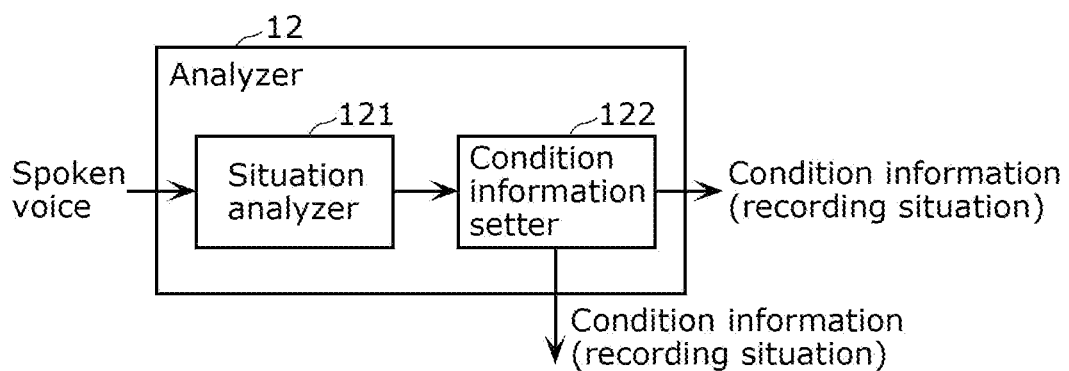
FIG. 4 illustrates one example of the configuration of an analyzer according to an embodiment of the present disclosure in detail.

FIG. 4 illustrates one example of the configuration of analyzer 12 according to the present embodiment in detail.

Analyzer 12 analyzes condition information indicating a condition to be used in calculating the speaker feature, based on the spoken voice obtained from spoken voice obtainer 111a. As illustrated in FIG. 4, in the present embodiment, analyzer 12 includes situation analyzer 121 and condition information setter 122.

Situation analyzer 121 analyzes the recording situation of the spoken voice from the spoken voice obtained from spoken voice obtainer 111a. Situation analyzer 121 analyzes, as the recording situation of the spoken voice, at least one of the noise level at the time of recording the spoken voice, the microphone used to record the spoken voice, or a data attribute of the spoken voice. Situation analyzer 121 does so because aspects of the speaker feature, which is a feature calculated by speaker feature calculator 14 (to be described later) that is unique to the speaker of the spoken voice, vary depending on the recording situation of the spoken voice, i.e., the situation under which the spoken voice was recorded, indicators of which are noise level, the microphone used, and a data attribute of the spoken voice. Note that a data attribute is, for example, the sex of the speaker of the spoken voice, or the language used by the speaker of the spoken voice.

Figure 5:
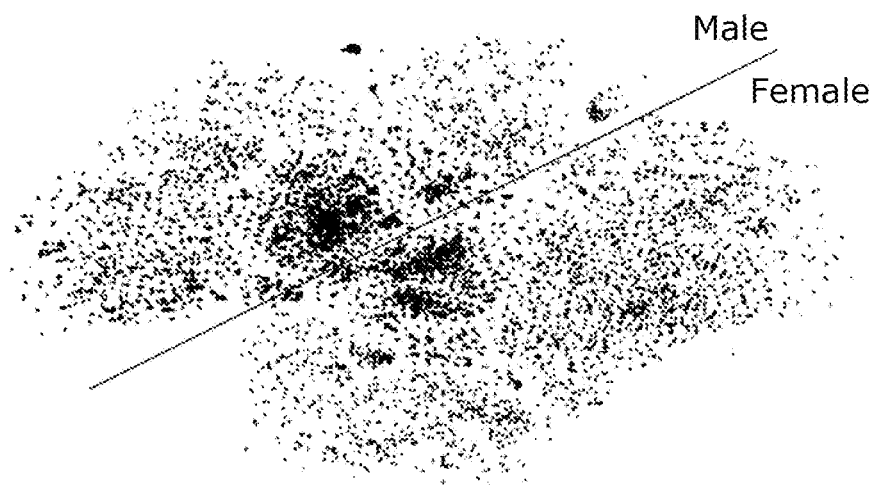
FIG. 5 illustrates one example of a feature distribution for different sexes of speakers of spoken voices.

FIG. 5 illustrates one example of a feature distribution for different sexes of speakers of spoken voices. The feature distribution in FIG. 5 illustrates a two-dimensional compression of features extracted using the x-Vector method for each of 33,000 samples of voice data. As used herein, the x-Vector method is a method for calculating a speaker feature, which is a characteristic unique to the speaker, referred to as an x-Vector. As illustrated in FIG. 5, the feature distribution for male voices and the feature distribution for female voices differ.

Condition information setter 122 sets the recording situation analyzed by situation analyzer 121 as the condition information. In the present embodiment, condition information setter 122 transmits the recording situation set as the condition information to speaker feature calculator 14 and information transmitter 15.

1.3.1.3 Acoustic Feature Calculator 13

Acoustic feature calculator 13 calculates an acoustic feature of the spoken voice. In the present embodiment, acoustic feature calculator 13 calculates an acoustic feature of the spoken voice from the voice signal of the spoken voice obtained from spoken voice obtainer 111a. In the present embodiment, acoustic feature calculator 13 calculates mel-frequency cepstrum coefficients (MFCC), which is a physical amount of voice, from the voice signal of the spoken voice. MFCC function is a feature that represents the vocal tract characteristics of the speaker. Acoustic feature calculator 13 is not limited to calculating MFCC as the acoustic feature of the spoken voice, and may calculate the acoustic feature by applying a mel filter bank to the voice signal of the spoken voice, or calculate a spectrogram of the voice signal of the spoken voice. Acoustic feature calculator 13 may calculate the acoustic feature of the spoken voice from the voice signal of the spoken voice by using a deep neural network (DNN).

1.3.1.4 Speaker Feature Calculator 14

Speaker feature calculator 14 uses a DNN to calculate a speaker feature from the acoustic feature. The speaker feature is a feature unique to the speaker of the spoken voice. In the present embodiment, speaker feature calculator 14 causes the DNN to calculate the speaker feature from the acoustic feature calculated by acoustic feature calculator 13. Although, for example, a pre-trained DNN is used, a DNN that is trained in the background and periodically updated may be used.

Figure 6:
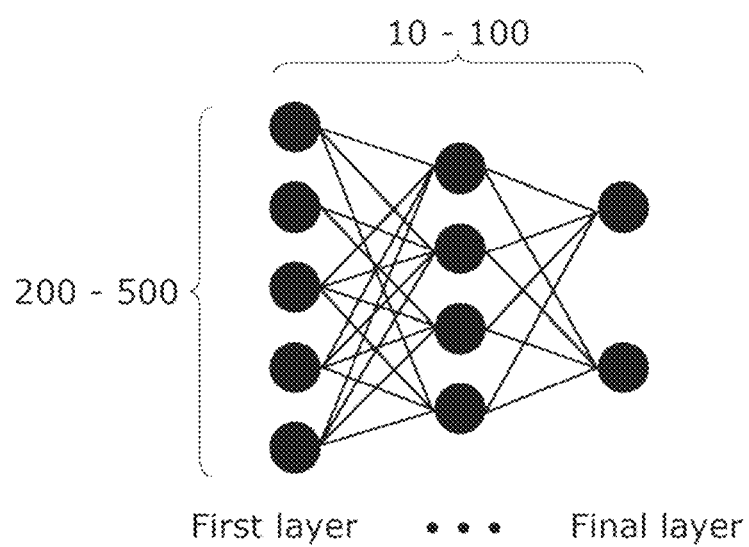
FIG. 6 illustrates one example of the configuration of a DNN according to an embodiment of the present disclosure.

FIG. 6 illustrates one example of the configuration of a DNN according to the present embodiment.

The DNN used by speaker feature calculator 14 is a neural network including an input layer, a plurality of intermediate layers, and an output layer. This DNN includes n+1 (n is a positive integer) or more layers. For example, as illustrated in FIG. 6, the input layer may be referred to as the first layer and the output layer as the final layer. For example, as illustrated in FIG. 6, this DNN includes 10 or more layers, and each layer includes 200 to 500 nodes. Note that this DNN may be a convolutional neural network (CNN) or a neural network other than a CNN, such as a neural network that uses fast Fourier transform (FFT).

1.3.1.5 Information Transmitter 15

Information transmitter 15 transmits the speaker feature and the condition information to information reception device 20, which performs speaker recognition processing on the spoken voice, as information to be used by information reception device 20 to recognize the speaker of the spoken voice. In the present embodiment, information transmitter 15 transmits, to information reception device 20, the condition information including the recording situation of the spoken voice obtained from analyzer 12 and the speaker feature calculated by speaker feature calculator 14. Although the condition information and the speaker feature are exemplified as being transmitted as part of the information to be used by information reception device 20 to recognize the speaker of the spoken voice, this example is non-limiting.

1.3.2 Information Reception Device 20

Information reception device 20 is realized by a computer including, for example, a processor (microprocessor), memory, and a communication interface, etc., and performs speaker recognition processing using information received from information transmission device 10. As illustrated in FIG. 3, information reception device 20 includes information receiver 201, speaker recognition device 22, and speaker display 28.

Information receiver 201 receives information transmitted from information transmission device 10 via network 3. In the present embodiment, information receiver 201 receives, from information transmission device 10, information including the condition information and the speaker feature, which is information to be used for recognizing the speaker of the spoken voice.

Speaker recognition device 22 performs speaker recognition processing and transmits the recognized speaker to speaker display 28. This will be described in greater detail later.

Speaker display 28 displays the speaker of the spoken voice recognized by speaker recognition device 22. For example, speaker display 28 is a display device.

So long as speaker recognition device 22 can obtain the condition information and the speaker feature included in the information transmitted via network 3, information reception device 20 need not include information receiver 201 or speaker display 28. In other words, if the condition information and the speaker feature included in the information transmitted via network 3 can be obtained by speaker recognition device 22, in information reception device 20, information receiver 201 and speaker display 28 are not essential elements.

1.3.2.1 Speaker Recognition Device 22

Speaker recognition device 22 is realized by a computer including, for example, a processor (microprocessor), memory, and a communication interface, etc. As illustrated in FIG. 3, speaker recognition device 22 includes condition information obtainer 23, storage 24, similarity calculator 25, speaker feature obtainer 26, and speaker identifier 27. So long as similarity calculator 25 (to be described later) can obtain the condition information and the speaker feature from information receiver 201, speaker recognition device 22 need not include condition information obtainer 23 or speaker feature obtainer 26. Next, each element will be described.

1.3.2.1.1 Condition Information Obtainer 23

Condition information obtainer 23 obtains the condition information included in the information transmitted from information transmission device 10. In the present embodiment, the condition information obtained by condition information obtainer 23 includes the recording situation of the spoken voice. As described above, the recording situation of the spoken voice refers to at least one of the noise level at the time of recording the spoken voice, the microphone used to record the spoken voice, or a data attribute of the spoken voice.

Condition information obtainer 23 transmits the recording situation included in the obtained condition information to similarity calculator 25.

1.3.2.1.2 Storage 24

Storage 24 is, for example, rewritable nonvolatile memory, such as a hard disk (drive) or a solid state drive. In storage 24, one or more registered speaker features, which are features unique to respective one or more registered speakers who are registered in advance, are stored per condition used to calculate the one or more registered speaker features.

In the example illustrated in FIG. 3, storage 24 stores registered speaker features for each of conditions A, B, and C, etc. Conditions A, B, and C, etc., are conditions indicating the recording situation of the spoken voice, which refers to at least one of the noise level at the time of recording the spoken voice, the microphone used to record the spoken voice, or a data attribute of the spoken voice.

The registered speaker features stored per condition are speaker features calculated based on the spoken voices of the registered speakers that are the subject of the speaker recognition processing performed by speaker recognition device 22. Here, the spoken voices are collected in advance and stored per condition. The registered speaker features for each condition include one or more speaker features of respective one or more registered speakers.

1.3.2.1.3 Speaker Feature Obtainer 26

Speaker feature obtainer 26 obtains the speaker feature included in the information transmitted from information transmission device 10. Here, the speaker feature obtained by speaker feature obtainer 26 is, as described above, a feature unique to the speaker of the spoken voice that is calculated from the acoustic feature of the spoken voice of the speaker by using a DNN. In this way, in the present embodiment, since speaker feature obtainer 26 obtains the calculated speaker feature, speaker recognition device 22 can not only omit the calculation of the acoustic feature of the spoken voice of the speaker, but can also omit the calculation of the speaker feature from the acoustic feature.

1.3.2.1.4 Similarity Calculator 25

Based on the obtained condition information and speaker feature, similarity calculator 25 calculates, for each registered speaker feature stored in storage 24, a similarity between the registered speaker feature and the speaker feature.

In the present embodiment, as illustrated in FIG. 3, similarity calculator 25 includes selector 251 and similarity calculation processor 252.

Among registered speaker features stored in storage 24, selector 251 selects the one or more registered speaker features of the one or more registered speakers that correspond to the condition that matches the recording situation obtained by condition information obtainer 23. In the example illustrated in FIG. 3, selector 251 selects, from among the registered speaker features corresponding to conditions A, B, and C, etc., that are stored in storage 24, the one or more registered speaker features corresponding to the condition that matches the recording situation, for example, condition A.

Similarity calculation processor 252 calculates, for each registered speaker feature of the one or more registered users selected by selector 251, a similarity between the registered speaker feature and the speaker feature obtained by speaker feature obtainer 26. In the example illustrated in FIG. 3, similarity calculation processor 252 calculates, for each registered speaker feature corresponding to condition A selected by selector 251, a similarity between the registered speaker feature and the speaker feature obtained by speaker feature obtainer 26.

Note that similarity calculation processor 252 may calculate the similarity between each registered speaker feature corresponding to the condition selected by selector 251 and the speaker feature obtained by speaker feature obtainer 26 by calculating cosines using dot products in the vector space model. In such cases, a larger value of the angle between vectors indicates a lower degree of similarity. Similarity calculation processor 252 may calculate a cosine distance that takes values from −1 to 1 using dot products of the vectors indicating each of the selected registered speaker features corresponding to the condition and the vector indicating the speaker feature obtained by speaker feature obtainer 26. In this case, a larger value indicating the cosine distance indicates a higher degree of similarity. It goes without saying that the methods used by similarity calculation processor 252 to calculate the similarity are not limited to these examples.

1.3.2.1.5 Speaker Identifier 27

Speaker identifier 27 identifies and outputs which one of the one or more registered speakers stored in storage 24 the speaker of the spoken voice is, based on the one or more similarities calculated by similarity calculator 25.

In the present embodiment, speaker identifier 27 identifies which one of the one or more registered speakers selected by selector 251 the speaker of the spoken voice is, based on the one or more similarities calculated by similarity calculation processor 252, and outputs the identified registered speaker to speaker display 28. Here, speaker identifier 27 identifies the registered speaker feature having the highest similarity calculated by similarity calculation processor 252, and thus identifies that the registered speaker of the identified registered speaker feature is the speaker of the spoken voice.

In this way, speaker identifier 27 identifies the speaker of the spoken voice by identifying the registered speaker feature closest to the speaker feature obtained by speaker feature obtainer 26.

1.4 Operations Performed by Information Transmission Device 10 and Information Reception Device 20

Next, operations performed by information transmission device 10 and information reception device 20 configured as described above will be described.

Figure 7:
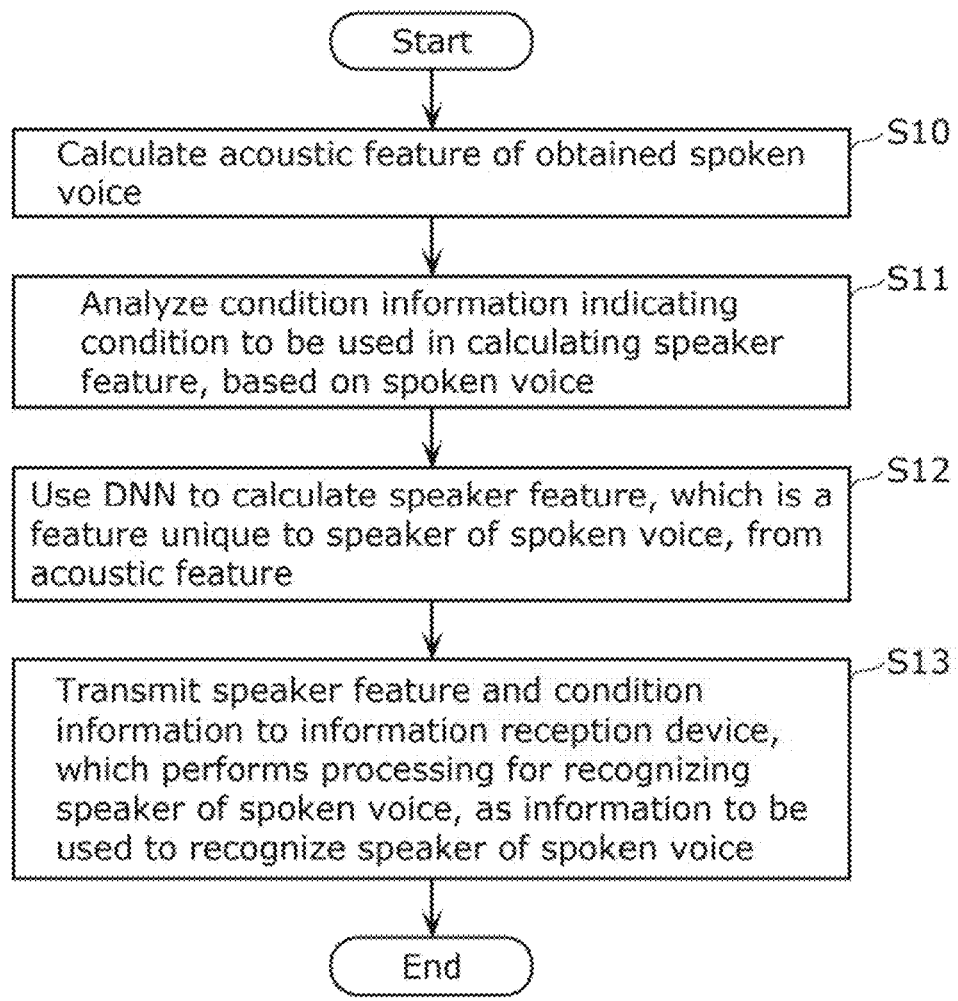
FIG. 7 is a flowchart illustrating operations performed by an information transmission device according to an embodiment of the present disclosure.
Figure 8:
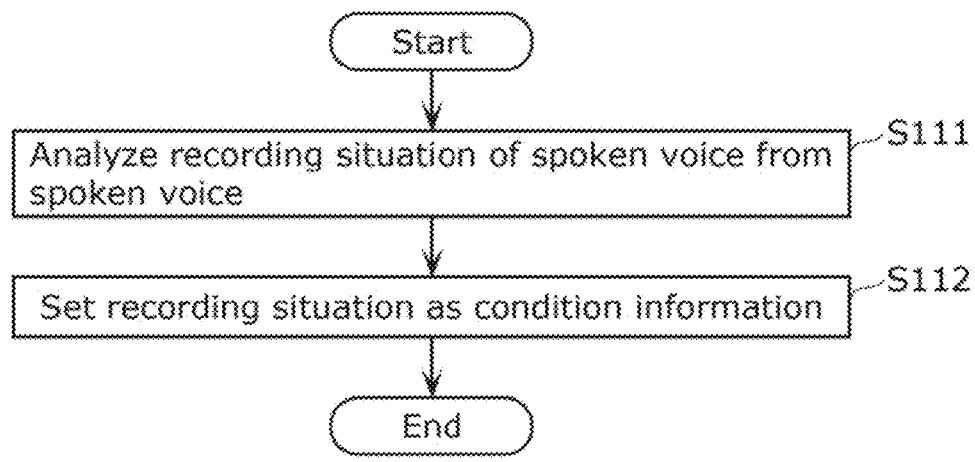
FIG. 8 is a flowchart illustrating the operation of step S11 in greater detail.

FIG. 7 is a flowchart illustrating operations performed by information transmission device 10 according to the present embodiment. FIG. 8 is a flowchart illustrating the operation of step S11 in greater detail.

First, information transmission device 10 calculates the acoustic feature of the spoken voice obtained by spoken voice obtainer 111*a* (S10).

Next, information transmission device 10 analyzes the condition information indicating the condition to be used in calculating the speaker feature, based on the obtained spoken voice (S11). More specifically, first, as illustrated in FIG. 8, information transmission device 10 analyzes, from the spoken voice obtained by spoken voice obtainer 111a, the recording situation of the spoken voice (S111). Next, information transmission device 10 sets the recording situation analyzed in step S111 as the condition information (S112).

Next, information transmission device 10 uses a DNN to calculate the speaker feature, which is a feature unique to the speaker of the spoken voice, from the acoustic feature calculated in step S10 (S12). Note that the processes in steps S11 and S12 are not limited to being performed in this order, and may be performed in the reverse order or in parallel.

Next, information transmission device 10 transmits the speaker feature calculated in step S12 and the condition information analyzed in step S11 to information reception device 20, which performs speaker recognition processing on the spoken voice, as information to be used by information reception device 20 to recognize the speaker of the spoken voice (S13).

Figure 9:
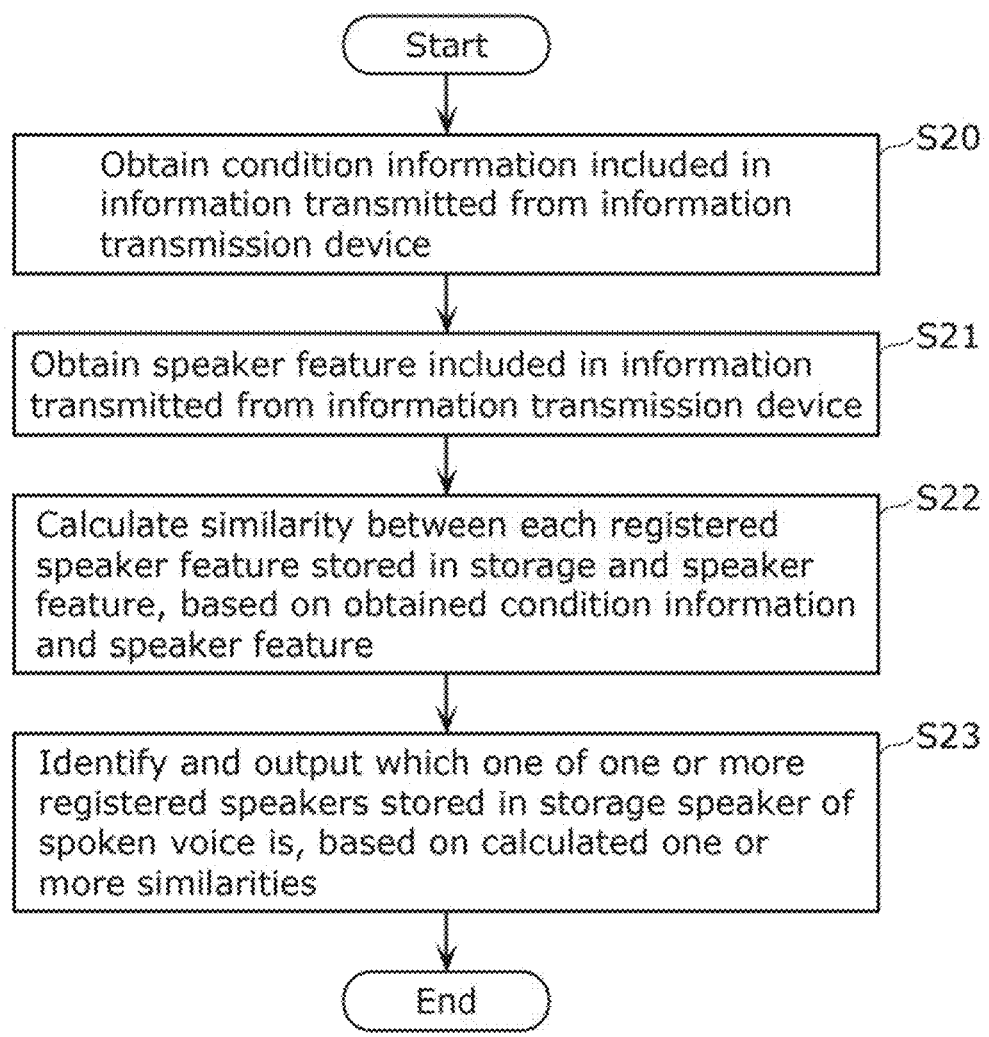
FIG. 9 is a flowchart illustrating operations performed by an information reception device according to an embodiment of the present disclosure.

FIG. 9 is a flowchart illustrating operations performed by information reception device 20 according to the present embodiment.

First, information reception device 20 obtains the condition information included in the information transmitted from information transmission device 10 (S20).

Next, information reception device 20 obtains the speaker feature included in the information transmitted from information transmission device 10 (S21). Note that the processes in steps S20 and S21 are not limited to being performed in this order, and may be performed in the reverse order or in parallel.

Next, based on the condition information obtained in step S20 and the speaker feature obtained in step S21, information reception device 20 calculates, for each registered speaker feature stored in storage 24, a similarity between the registered speaker feature and the speaker feature (S22). As described above, in storage 24, one or more registered speaker features, which are features unique to respective one or more registered speakers who are registered in advance, are stored per condition used to calculate the one or more registered speaker features.

Next, information reception device 20 identifies and outputs which one of the one or more registered speakers stored in storage 24 the speaker of the spoken voice is, based on the one or more similarities calculated in step S22 (S23).

Figure 10:
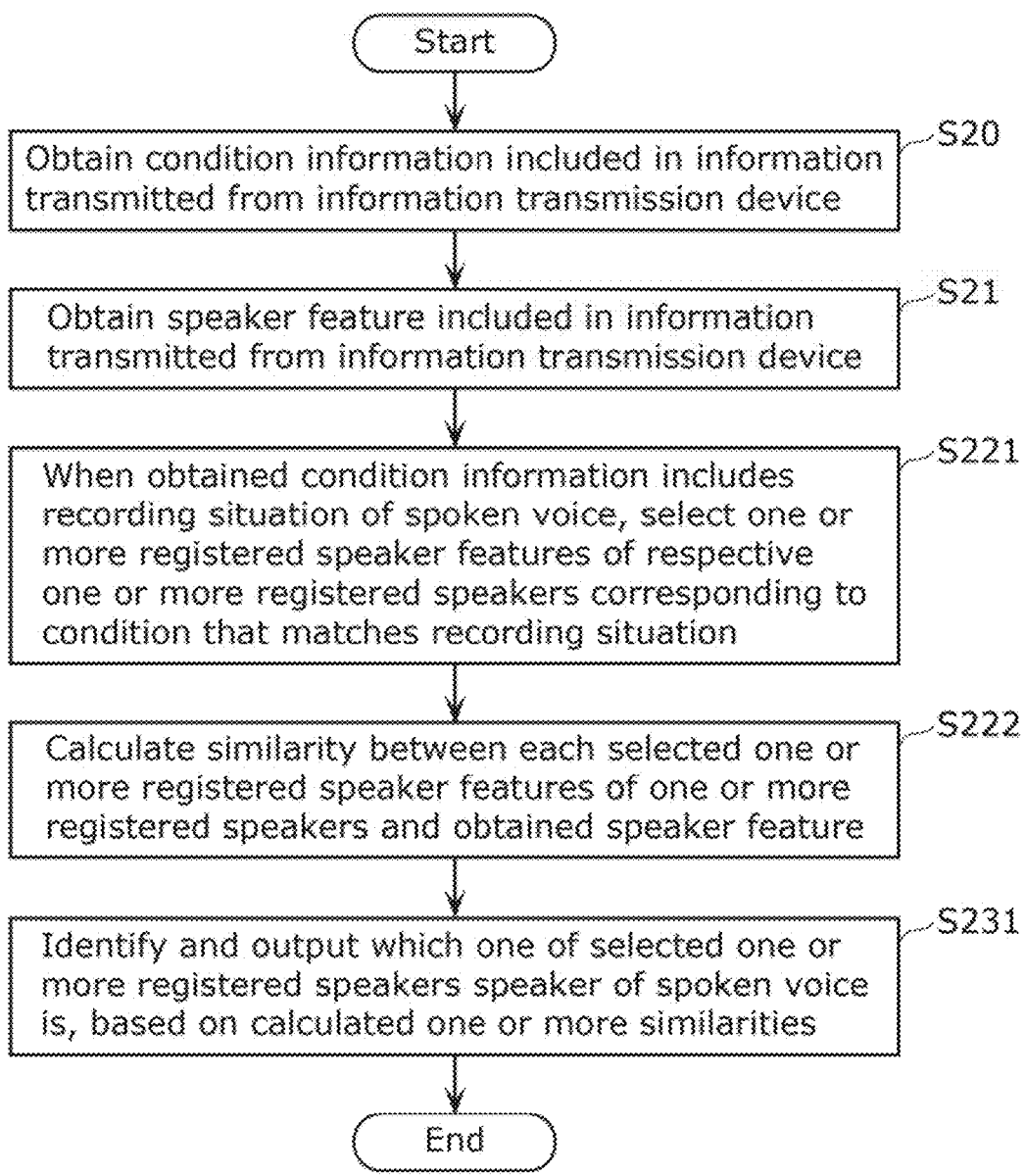
FIG. 10 is a flowchart illustrating operations performed by an information reception device according to an embodiment of the present disclosure in greater detail.

FIG. 10 is a flowchart illustrating operations performed by information reception device 20 according to the present embodiment in greater detail. Processes that are the same as in FIG. 9 share the same reference signs, and detailed description thereof will be omitted.

In step S221 that follows step S21, when the condition information obtained in step S20 includes the recording situation of the spoken voice, information reception device 20 selects the one or more registered speaker features of the one or more registered speakers that correspond to the condition that matches the recording situation.

Next, information reception device 20 calculates, for each of the one or more registered speaker features of the one or more registered speakers selected in step S221, a similarity between the registered speaker feature and the speaker feature obtained in step S21 (S222).

Next, based on the one or more similarities calculated in step S222, information reception device 20 identifies and outputs which one of the one or more registered speakers selected in step S221 the speaker of the spoken voice is (S231).

1.5 Advantageous Effects, Etc.

As described above, according to the present embodiment, the speaker recognition processing performed by information reception device 20 can be distributed and partially carried out by information transmission device 10. Stated differently, by information transmission device 10 according to the present embodiment transmitting information to be used by information reception device 20 to recognize the speaker of the spoken voice, information reception device 20 can omit a portion of the computation for performing the speaker recognition processing.

More specifically, information transmission device 10 calculates the acoustic feature of the spoken voice, performs processing for calculating the speaker feature from the acoustic feature, includes the result of the processing in the information described above, and transmits the information to information reception device 20. With this, information reception device 20 can not only omit the calculation of the acoustic feature of the spoken voice of the speaker, but can omit the calculation of the speaker feature as well. In other words, since information reception device 20 can omit a portion of the computation for performing the speaker recognition processing, the computational load for performing the speaker recognition processing can be reduced.

Therefore, according to the present embodiment, the computational load of the speaker recognition processing can be distributed, whereby the computational load required of information reception device 20 to perform the speaker recognition processing can be inhibited.

Moreover, with information transmission device 10 according to the present embodiment, the analyzed recording situation of the spoken voice is included in the above-described information as condition information and transmitted to information reception device 20. This allows information reception device 20 to select the registered speaker feature(s) corresponding to the recording situation and calculate the similarity between the speaker feature and each selected registered speaker feature. In other words, since information reception device 20 does not need to calculate a similarity between the calculated speaker feature and each and every registered speaker feature under every condition, computational load can be reduced. Therefore, according to the present embodiment, the computational load of the speaker recognition processing can be distributed, whereby the computational load required of information reception device 20 to perform the speaker recognition processing can be inhibited.

Variation 1

The above embodiment describes an example in which the information transmission device uses a DNN to calculate the speaker feature of the spoken voice and includes the speaker feature in the information to be transmitted, but the present disclosure is not limited to this example. The information transmission device may use a portion of the DNN to calculate a first speaker feature corresponding to a portion of the speaker feature of the spoken voice and include the first speaker feature in the information to be transmitted. In such a case, the information reception device may use the other part of the DNN to calculate the speaker feature of the spoken voice from the first speaker feature. This case is described below as Variation 1. The following will focus on the points of difference with the embodiment described above.

Figure 11:
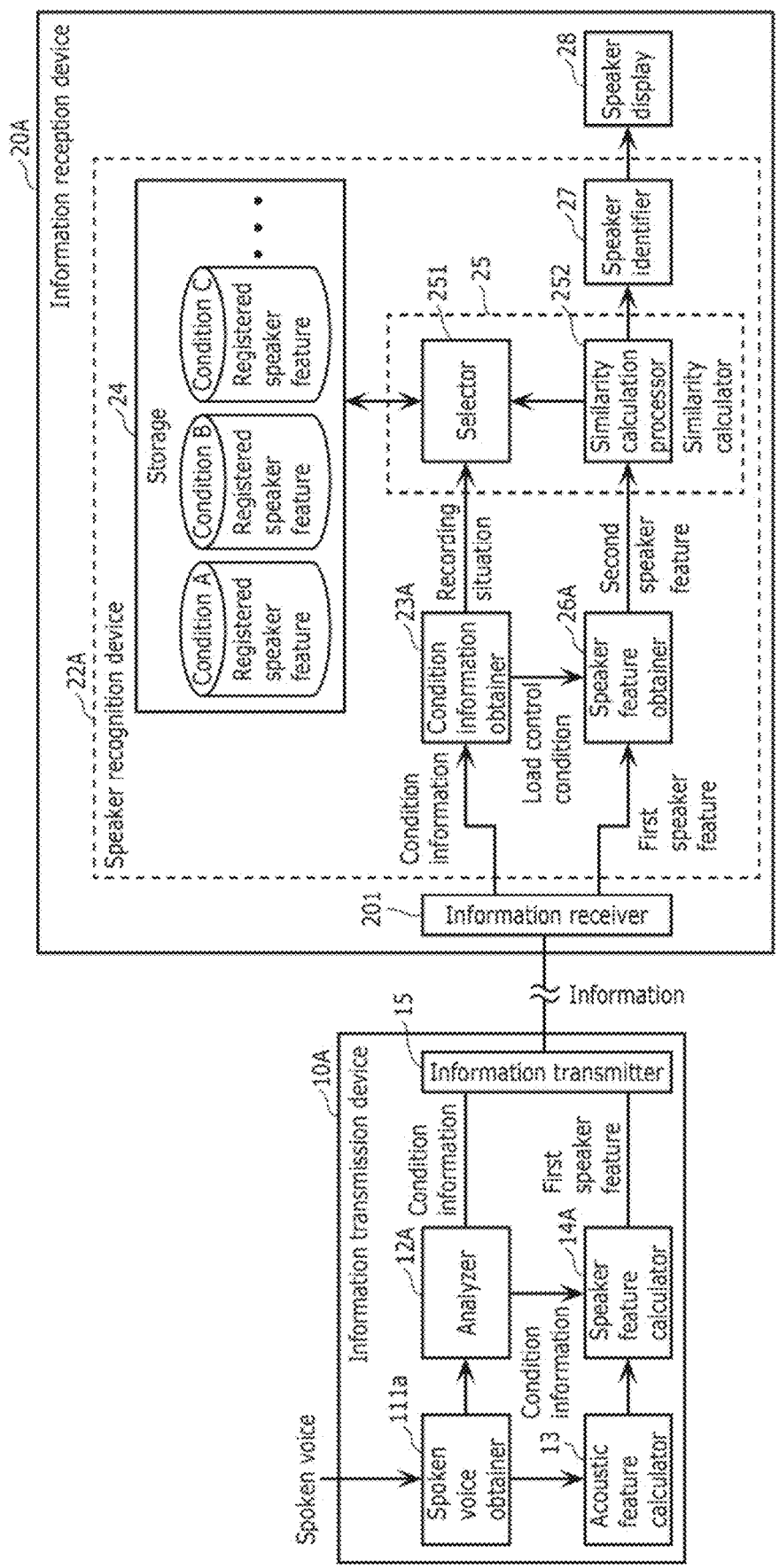
FIG. 11 is a block diagram illustrating an example of the configuration of an information transmission device and an information reception device according to Variation 1 in detail.

2.1 Detailed Configuration of Information Transmission Device 10A and Information Reception Device 20A FIG. 11 is a block diagram illustrating an example of the configuration of information transmission device 10A and information reception device 20A according to Variation 1 in detail. Elements that are the same as in FIG. 3 share the same reference signs, and detailed description thereof will be omitted.

2.1.1 Information Transmission Device 10A

Information transmission device 10A illustrated in FIG. 11 differs from information transmission device 10 illustrated in FIG. 3 in regard to the configurations of analyzer 12A and speaker feature calculator 14A. The following will focus on the points of difference with the embodiment described above.

2.1.1.1 Analyzer 12A

Figure 12:
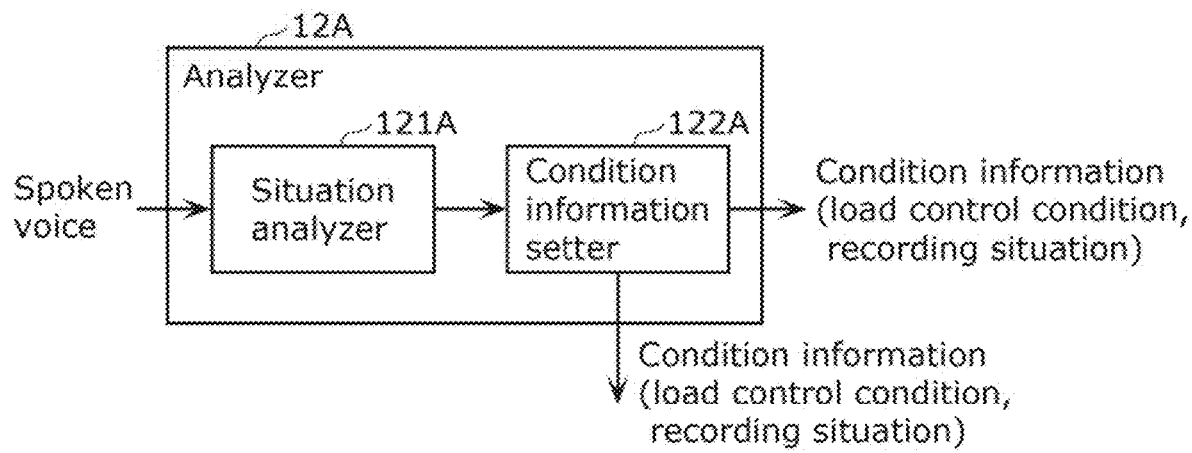
FIG. 12 illustrates one example of the configuration of an analyzer according to Variation 1 in detail.

FIG. 12 illustrates one example of the configuration of analyzer 12A according to Variation 1 in detail. Elements that are similar to those in FIG. 4 share the same reference signs, and detailed description thereof will be omitted.

Analyzer 12A analyzes condition information indicating a condition to be used in calculating the speaker feature, based on the spoken voice obtained from spoken voice obtainer 111a. As illustrated in FIG. 12, in the present variation, analyzer 12A includes situation analyzer 121A and condition information setter 122A.

Situation analyzer 121A analyzes the recording situation of the spoken voice from the spoken voice obtained from spoken voice obtainer 111a. Situation analyzer 121A further analyzes the speaking duration of the spoken voice obtained from spoken voice obtainer 111a.

Condition information setter 122A sets the recording situation analyzed by situation analyzer 121A as the condition information. Based on the speaking duration analyzed by situation analyzer 121A, condition information setter 122A further sets, as the condition information, a load control condition indicating that the DNN to be used by speaker feature calculator 14A is a first DNN, which is a portion of the DNN. Here, as illustrated in FIG. 6, assuming the DNN includes first through final layers, the first DNN corresponds to the first through $n^{th}$ (n is a positive integer) layers of the DNN, which is a portion of the DNN.

In this way, condition information setter 122A sets the recording situation of the spoken voice and the load control condition as the condition information. Note that condition information setter 122A sets the recording situation of the spoken voice and the load control condition as the condition information by including the recording situation of the spoken voice and the load control condition in the condition information.

2.1.1.2 Speaker Feature Calculator 14A

Speaker feature calculator 14A is a functional unit that uses the DNN to calculate the speaker feature from the acoustic feature.

Figure 13:
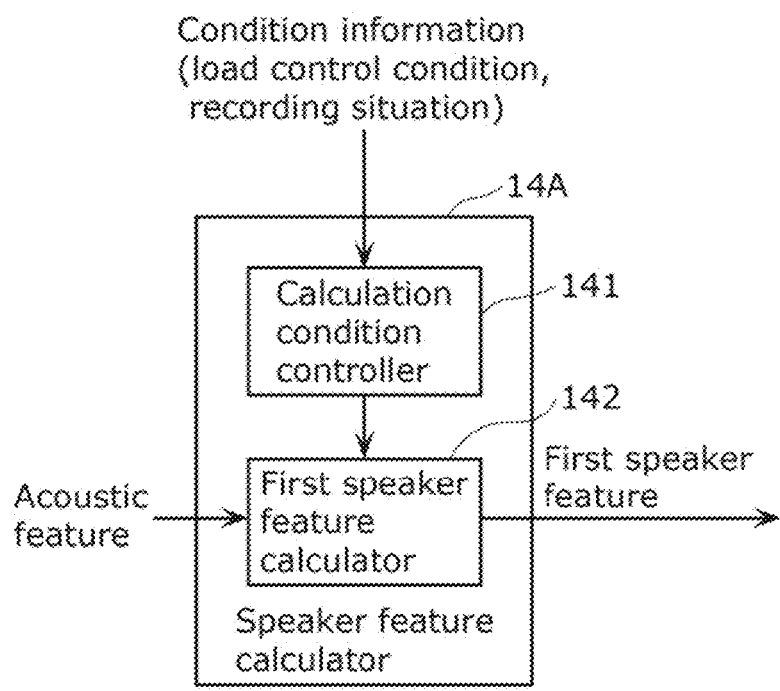
FIG. 13 illustrates one example of the configuration of a speaker feature calculator according to Variation 1 in detail.

FIG. 13 illustrates one example of the configuration of speaker feature calculator 14A according to Variation 1 in detail.

As illustrated in FIG. 13, speaker feature calculator 14A includes calculation condition controller 141 and first speaker feature calculator 142.

Calculation condition controller 141 obtains the condition information set by condition information setter 122A. Here, the condition information includes the recording situation of the spoken voice and the load control condition. In accordance with the load control condition included in the obtained condition information, calculation condition controller 141 causes first speaker feature calculator 142 to perform feature calculation processing using the first DNN.

Using the first DNN, first speaker feature calculator 142 calculates a first speaker feature from the acoustic feature obtained by acoustic feature calculator 13. The first speaker feature is a mid-calculation of the speaker feature, which is a feature unique to the speaker of the spoken voice. First speaker feature calculator 142 may calculate the first speaker feature, which is a mid-calculation of the speaker feature, by causing the DNN to calculate the speaker feature from the obtained acoustic feature and output the output from the final layer of the first DNN as the first speaker feature.

In this way, in accordance with the load control condition, speaker feature calculator 14A can use a first DNN, which is a portion of the DNN, to calculate a first speaker feature, which is a mid-calculation of the speaker feature and therefore corresponds to a portion of the speaker feature, from the obtained acoustic feature. Speaker feature calculator 14A transmits the calculated first speaker feature to information transmitter 15 as the speaker feature.

With this, information transmission device 10A causes information transmitter 15 to transmit, to information reception device 20A, the condition information including the recording situation of the spoken voice and the load control condition obtained from analyzer 12A, and the first speaker feature as the speaker feature calculated by speaker feature calculator 14A.

2.1.2 Information Reception Device 20A

Information reception device 20A receives information from information transmission device 10A and uses the received information to perform speaker recognition processing.

In the present variation, as illustrated in FIG. 11, information reception device 20A includes information receiver 201, speaker recognition device 22A, and speaker display 28. In other words, information reception device 20A illustrated in FIG. 11 differs from information reception device 20 illustrated in FIG. 3 in regard to the configuration of speaker recognition device 22A. The following will focus on the points of difference with the embodiment described above.

2.1.2.1 Speaker Recognition Device 22A

Speaker recognition device 22A uses the information obtained from information receiver 201 to perform speaker recognition processing, and transmits the recognized speaker to speaker display 28.

Speaker recognition device 22A illustrated in FIG. 11 differs from speaker recognition device 22 illustrated in FIG. 3 in regard to the configurations of condition information obtainer 23A and speaker feature obtainer 26A.

2.1.2.1.1 Condition Information Obtainer 23A

Condition information obtainer 23A obtains the condition information included in the information transmitted from information transmission device 10A. In the present variation, condition information obtainer 23A obtains, from information receiver 201, the condition information included in the information transmitted from information transmission device 10A. The condition information obtained by condition information obtainer 23A includes, in addition to the recording situation of the spoken voice, a load control condition indicating that the first DNN, which is a portion of the DNN and includes the first through $n^{th}$ (n is a positive integer) layers of the DNN, is used instead of the DNN.

Among the recording situation and the load control condition included in the obtained condition information, condition information obtainer 23A transmits the load control condition to speaker feature obtainer 26A and the recording situation to similarity calculator 25.

2.1.2.1.2 Speaker Feature Obtainer 26A

Speaker feature obtainer 26A obtains, as the speaker feature included in the information transmitted from information transmission device 10A, a first speaker feature, which is a mid-calculation of the speaker feature, and calculates, from the obtained first speaker feature, a second speaker feature, which is the speaker feature.

Figure 14:
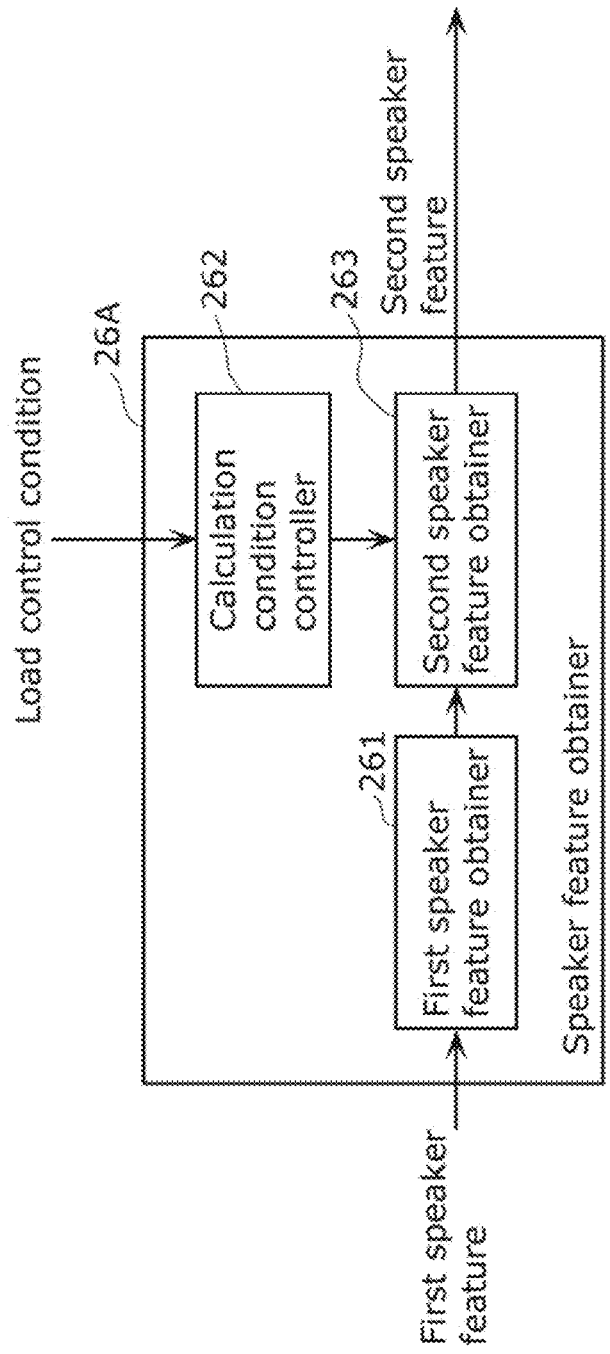
FIG. 14 illustrates one example of the configuration of a speaker feature obtainer according to Variation 1 in detail.
Figure 15:
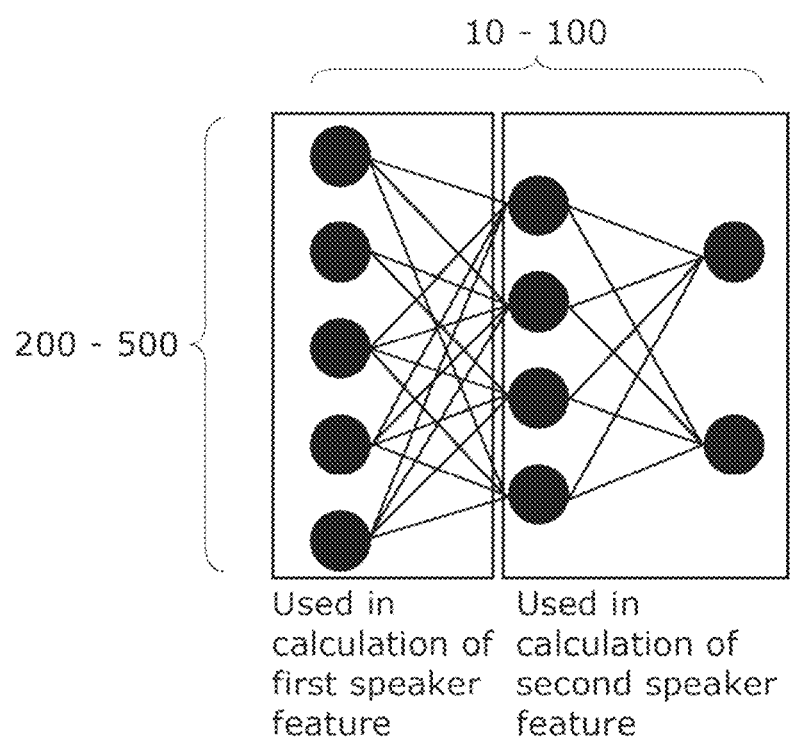
FIG. 15 illustrates the configuration of a DNN according to Variation 1 and conceptually illustrates the components used in the calculation of the first speaker feature and the components used in the calculation of the second speaker feature.

FIG. 14 illustrates one example of the configuration of speaker feature obtainer 26A according to Variation 1 in detail. FIG. 15 illustrates the configuration of the DNN according to Variation 1 and conceptually illustrates the components used in the calculation of the first speaker feature and the components used in the calculation of the second speaker feature.

As illustrated in FIG. 14, speaker feature obtainer 26A includes first speaker feature obtainer 261, calculation condition controller 262 and second speaker feature calculator 263.

First speaker feature obtainer 261 obtains the first speaker feature, which is a mid-calculation of the speaker feature, as the speaker feature included in the information transmitted from information transmission device 10A. Here, as described above, the first speaker feature is a mid-calculation of the speaker feature and is calculated using the first DNN. Assuming that the DNN is configured as illustrated in FIG. 6, the first DNN corresponds to a portion of the DNN illustrated in FIG. 15, and includes the first through $n^{th}$ (n is a positive integer) layers of the DNN.

Calculation condition controller 262 obtains the load control condition transmitted by condition information obtainer 23A. In accordance with the obtained load control condition, calculation condition controller 262 causes second speaker feature calculator 263 to perform feature calculation processing using a second DNN. Here, the second DNN corresponds to the other portion of the DNN illustrated in FIG. 15, and includes the $n+1^{th}$ to final layers of the DNN, which is a portion of the DNN.

Second speaker feature calculator 263 uses the second DNN to calculate a second speaker feature, which is the speaker feature, from the obtained first speaker feature. Note that second speaker feature calculator 263 inputs the first speaker feature into the layer after the final layer of the first DNN included the same DNN used by speaker feature calculator 14A of information transmission device 10A. This allows second speaker feature calculator 263 to cause the second DNN to calculate the second speaker feature.

Second speaker feature calculator 263 outputs the calculated second speaker feature to similarity calculator 25 (more specifically, to similarity calculation processor 252).

In this way, based on the transmitted load control condition, speaker feature obtainer 26A can use the second DNN, which corresponds to the other portion of the DNN, to calculate the second speaker feature, which is the speaker feature of the spoken voice, from the obtained first speaker feature.

2.2 Operations Performed by Information Transmission Device 10A and Information Reception Device 20A Next, operations performed by information transmission device 10A and information reception device 20A configured as described above will be described.

Figure 16A:
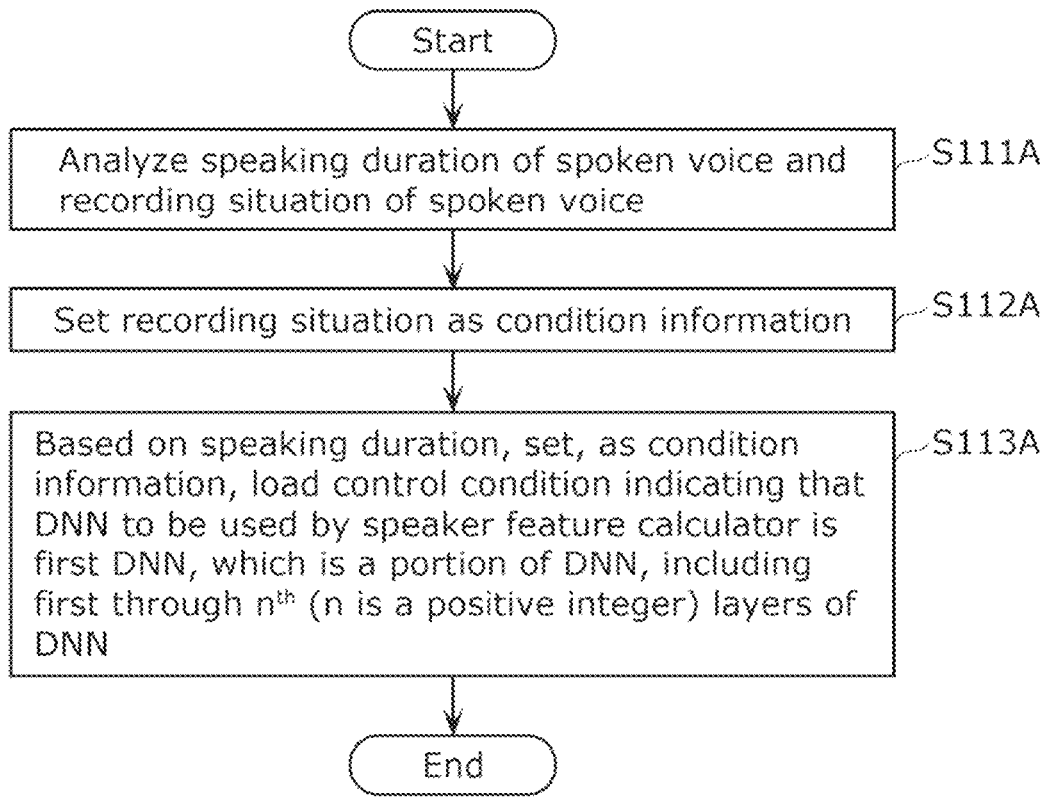
FIG. 16A is a flowchart illustrating operations performed by the information transmission device according to Variation 1 in detail.
Figure 16B:
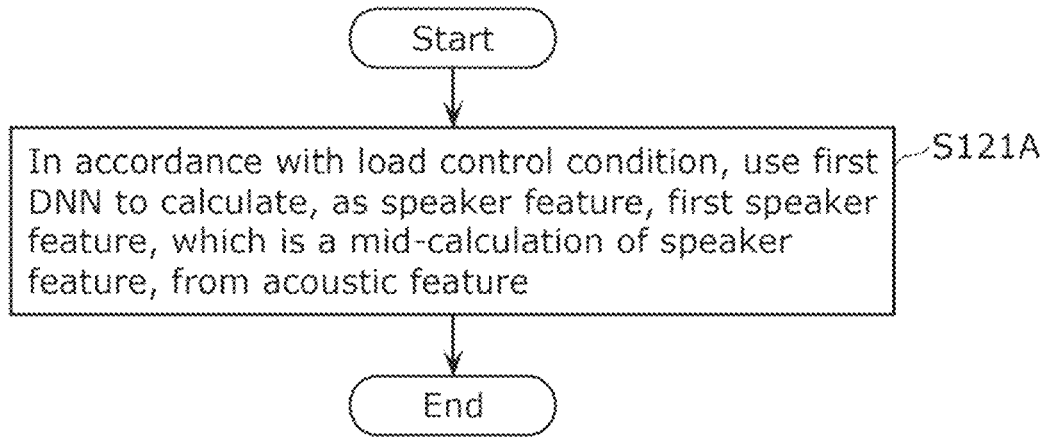
FIG. 16B is a flowchart illustrating operations performed by the information transmission device according to Variation 1 in detail.

FIG. 16A and FIG. 16B are flowcharts illustrating operations performed by information transmission device 10A according to Variation 1 in detail. The operations according to Variation 1 that are illustrated in FIG. 16A correspond to a more detailed description of step S11 illustrated in FIG. 7. The operations according to Variation 1 that are illustrated in FIG. 16B correspond to a more detailed description of step S12 illustrated in FIG. 7.

In step S11 illustrated in FIG. 7, information transmission device 10A first analyzes the recording situation of the spoken voice from the obtained spoken voice and analyzes the speaking duration of the spoken voice, as illustrated in FIG. 16A (S111A). Next, information transmission device 10A sets the recording situation analyzed in step S111A as the condition information (S112A). Based on the analyzed speaking duration, information transmission device 10A sets, as the condition information, a load control condition indicating that the DNN to be used in the speaker feature calculation processing is a first DNN, which is a portion of the DNN and includes first through $n^{th}$ (n is a positive integer) layers of the DNN (S113A). Note that the processes in steps S112A and S113A are not limited to being performed in this order, and may be performed in the reverse order or in parallel.

In step S12 illustrated in FIG. 7, in accordance with the load control condition, information transmission device 10A uses the first DNN to calculate, as the speaker feature, a first speaker feature, which is a mid-calculation of the speaker feature, from the acoustic feature calculated in step S10, as illustrated in FIG. 16B (S121A). Note that the load control condition set in step S113A in FIG. 16A has been transmitted to information transmission device 10A, and information transmission device 10A calculates the first speaker feature in accordance with the transmitted load control condition.

FIG. 17 is a flowchart illustrating operations performed by information reception device 20A according to Variation 1 in detail. Processes that are the same as in FIG. 9 and FIG. 10 share the same reference signs.

First, information reception device 20A obtains the condition information included in the information transmitted from information transmission device 10A (S20).

Next, information reception device 20A obtains the first speaker feature as the speaker feature included in the information transmitted from information transmission device 10A (S211A). As described above, the first speaker feature is a mid-calculation of the speaker feature, which is a feature unique to the speaker of the spoken voice, and is calculated from the obtained acoustic feature by using the first DNN, which is a portion of the DNN. The first DNN is, for example, the portion of the DNN corresponding to the first to $n^{th}$ (n is a positive integer) layers of the DNN.

Next, based on the load control condition included in the condition information obtained in step S20, information reception device 20A uses the second DNN, which is the other portion of the DNN, to calculate the second speaker feature, which is a feature unique to the speaker of the spoken voice, from the obtained first speaker feature (S212A). Here, the second DNN corresponds to the other portion of the DNN, and includes, for example, the $n+1^{th}$ to final layers of the DNN, which is a portion of the DNN.

Next, information reception device 20A selects one or more registered speaker features of one or more registered speakers corresponding to the condition that matches the recording situation of the spoken voice included in the condition information obtained in step S20 (S221A). Note that the processes in steps S211A, S211B, and S221A are not limited to being performed in this order, and may be performed in the reverse order or in parallel.

Next, information reception device 20A calculates, for each of the one or more registered speaker features of the one or more registered speakers selected in step S221A, a similarity between the registered speaker feature and the second speaker feature calculated in step S212A (S222A).

Next, based on the one or more similarities calculated in step S222A, information reception device 20A identifies and outputs which one of the one or more registered speakers selected in step S221A the speaker of the spoken voice is (S223A).

2.3 Advantageous Effects, Etc.

As described above, according to Variation 1, the speaker recognition processing performed by information reception device 20A can be distributed and partially carried out by information transmission device 10A. Stated differently, by information transmission device 10A according to Variation 1 transmitting information to be used by information reception device 20A to recognize the speaker of the spoken voice, information reception device 20A can omit a portion of the computation for performing the speaker recognition processing.

More specifically, information transmission device 10A calculates the acoustic feature of the spoken voice, and from the calculated acoustic feature, calculates the first speaker feature, which corresponds to a portion of the speaker feature, and is a mid-calculation of the speaker feature. Information transmission device 10A then includes, in the information described above, the calculated first speaker feature and the load control condition indicating the first DNN used to calculate the first speaker feature, and transmits the information to information reception device 20A. With this, information reception device 20A can not only omit the calculation of the acoustic feature of the spoken voice of the speaker, but can omit a portion of the calculation of the speaker feature by using the first speaker feature as well. In other words, since information reception device 20A can omit a portion of the computation for performing the speaker recognition processing, the computational load for performing speaker recognition processing can be reduced.

Therefore, according to Variation 1, the computational load of the speaker recognition processing can be distributed, whereby the computational load required of information reception device 20A to perform the speaker recognition processing can be inhibited.

Moreover, with information transmission device 10A according to Variation 1, the analyzed recording situation of the spoken voice is included in the above-described information as condition information and transmitted to information reception device 20A. This allows information reception device 20A to select the registered speaker feature(s) corresponding to the recording situation and calculate the similarity between the speaker feature and each selected registered speaker feature. In other words, since information reception device 20A does not need to calculate a similarity between the speaker feature and each and every registered speaker feature under every condition, computational load can be reduced. Therefore, according to Variation 1, the computational load of the speaker recognition processing can be distributed, whereby the computational load required of information reception device 20A to perform the speaker recognition processing can be inhibited.

Variation 2

In Variation 1 described above, the similarity calculator first selects, from among registered speaker features corresponding to a plurality of conditions stored in the storage, one or more registered speaker features corresponding to the condition that matches the recording situation included in the condition information transmitted from the information transmission device side, and then performs similarity calculation processing, but the present disclosure is not limited to this example. The similarity calculator may perform the similarity calculation processing for all registered speaker features corresponding to the plurality of conditions stored in the storage. This case is described below as Variation 2. The following will focus on the points of difference with the embodiment and Variation 1 described above.

Figure 18:
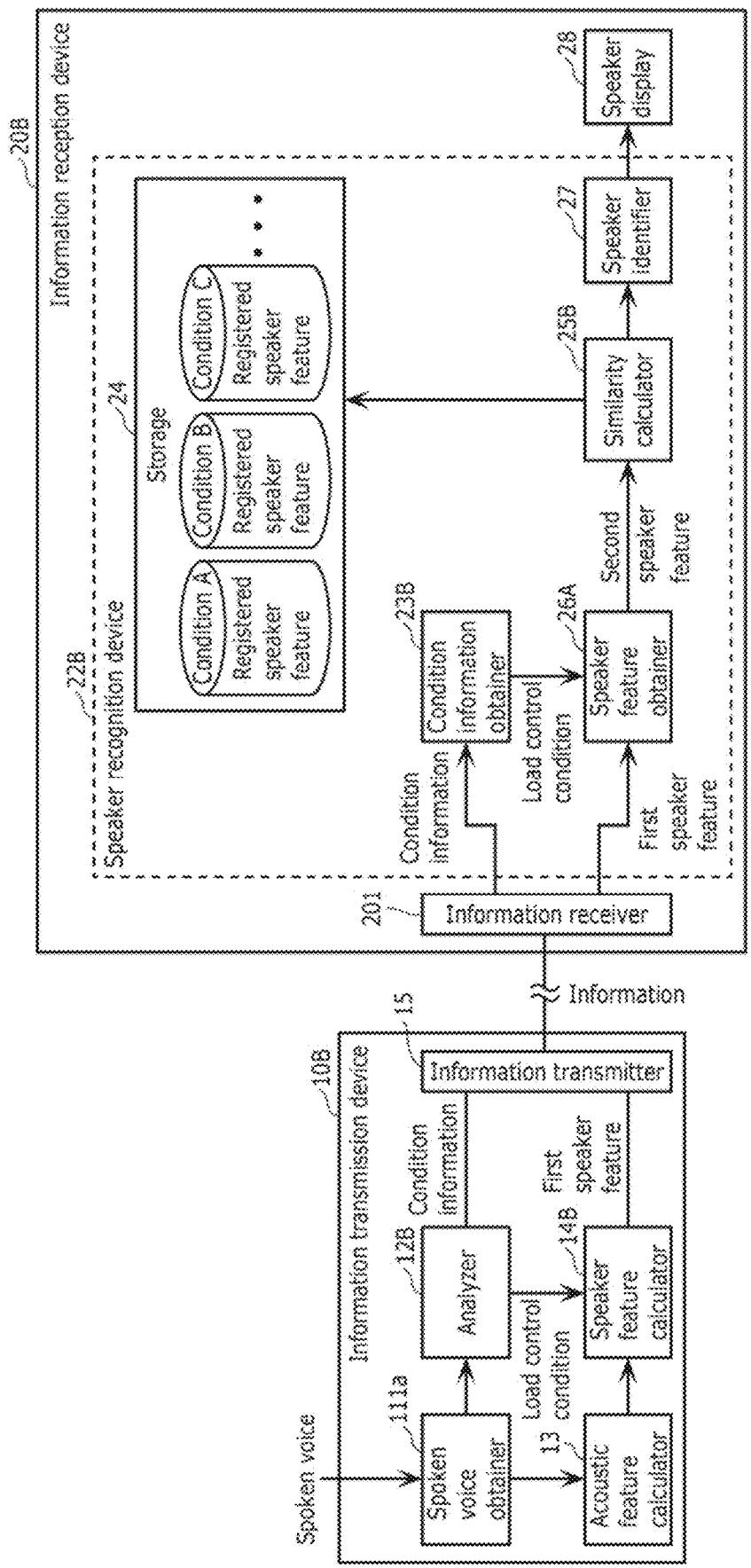
FIG. 18 is a block diagram illustrating an example of the configuration of an information transmission device and an information reception device according to Variation 2 in detail.

3.1 Detailed Configuration of Information Transmission Device 10B and Information Reception Device 20B FIG. 18 is a block diagram illustrating an example of the configuration of information transmission device 10B and information reception device 20B according to Variation 2 in detail. Elements that are the same as in FIG. 3 and FIG. 11 share the same reference signs, and detailed description thereof will be omitted.

3.1.1 Information Transmission Device 10B

Information transmission device 10B illustrated in FIG. 18 differs from information transmission device 10A illustrated in FIG. 11 in regard to the configurations of analyzer 12B and speaker feature calculator 14B. The following will focus on the points of difference with Variation 1 described above.

3.1.1.1 Analyzer 12B

Figure 19:
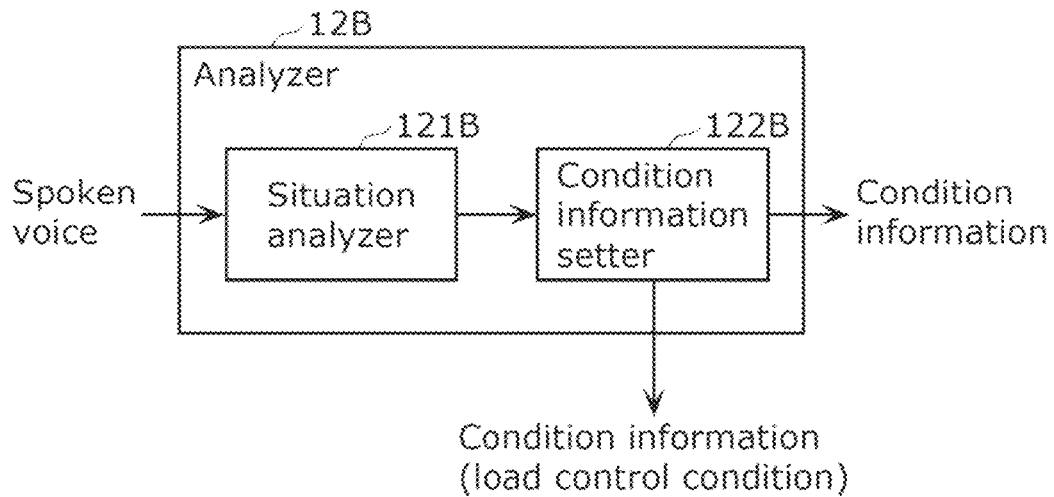
FIG. 19 illustrates one example of the configuration of an analyzer according to Variation 2 in detail.

FIG. 19 illustrates one example of the configuration of analyzer 12B according to Variation 2 in detail. Elements that are the same as in FIG. 4 and FIG. 12 share the same reference signs, and detailed description thereof will be omitted.

Analyzer 12B analyzes condition information indicating a condition to be used in calculating the speaker feature, based on the spoken voice obtained from spoken voice obtainer 111a. As illustrated in FIG. 19, in the present variation, analyzer 12B includes situation analyzer 121B and condition information setter 122B.

Situation analyzer 121B analyzes the speaking duration of the spoken voice obtained from spoken voice obtainer 111a. Note that in the present variation, unlike the embodiment and Variation 1 described above, situation analyzer 121B need not analyze the recording situation of the spoken voice.

Based on the speaking duration analyzed by situation analyzer 121B, condition information setter 122B sets, as the condition information, a load control condition indicating that the DNN to be used by speaker feature calculator 14B is a first DNN, which is a portion of the DNN. As described in Variation 1, the first DNN is the portion of the DNN corresponding to the first to nth (n is a positive integer) layers of the DNN.

In this way, condition information setter 122B sets the load control condition as the condition information. Note that condition information setter 122B sets the load control condition as the condition information by including the load control condition in the condition information.

3.1.1.2 Speaker Feature Calculator 14B

Speaker feature calculator 14B is a functional unit that uses the DNN to calculate the speaker feature from the acoustic feature.

Figure 20:
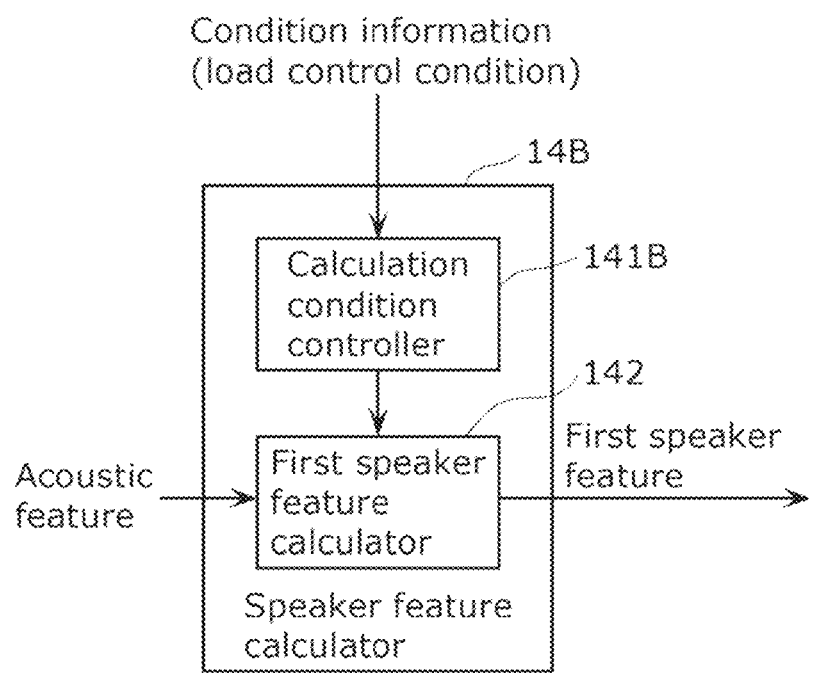
FIG. 20 illustrates one example of the configuration of a speaker feature calculator according to Variation 2 in detail.

FIG. 20 illustrates one example of the configuration of speaker feature calculator 14B according to Variation 2 in detail.

As illustrated in FIG. 20, speaker feature calculator 14B includes calculation condition controller 141B and first speaker feature calculator 142. Since first speaker feature calculator 142 is as already described in Variation 1, repeated description will be omitted.

Calculation condition controller 141B obtains the condition information set by condition information setter 122B. Here, the condition information includes the load control condition. In accordance with the load control condition included in the obtained condition information, calculation condition controller 141B causes first speaker feature calculator 142 to perform feature calculation processing using the first DNN.

In this way, in accordance with the load control condition, speaker feature calculator 14B can use a first DNN, which is a portion of the DNN, to calculate a first speaker feature, which is a mid-calculation of the speaker feature, from the obtained acoustic feature. Speaker feature calculator 14B transmits the calculated first speaker feature to information transmitter 15 as the speaker feature.

With this, information transmission device 10B causes information transmitter 15 to transmit, to information reception device 20B, the condition information including the load control condition obtained from analyzer 12B and the first speaker feature as the speaker feature calculated by speaker feature calculator 14B.

3.1.2 Information Reception Device 20B

Information reception device 20B receives information from information transmission device 10B and uses the received information to perform speaker recognition processing.

In the present variation, as illustrated in FIG. 18, information reception device 20B includes information receiver 201, speaker recognition device 22B, and speaker display 28. Stated differently, information reception device 20B illustrated in FIG. 18 differs from information reception device 20A illustrated in FIG. 11 in regard to the configuration of speaker recognition device 22B. The following will focus on the points of difference with Variation 1 described above.

3.1.2.1 Speaker Recognition Device 22B

Speaker recognition device 22B uses the information obtained from information receiver 201 to perform speaker recognition processing, and transmits the recognized speaker to speaker display 28.

Speaker recognition device 22B illustrated in FIG. 18 differs from speaker recognition device 22A illustrated in FIG. 11 in regard to the configurations of condition information obtainer 23B and similarity calculator 25B.

3.1.2.1.1 Condition Information Obtainer 23B

Condition information obtainer 23B obtains the condition information included in the information transmitted from information transmission device 10B. In the present variation, condition information obtainer 23B obtains, from information receiver 201, the condition information included in the information transmitted from information transmission device 10B. The condition information obtained by condition information obtainer 23B includes a load control condition indicating that the first DNN, which is a portion of the DNN and includes the first through nth (n is a positive integer) layers of the DNN, is used instead of the DNN. Note that in the present variation, unlike in Variation 1, the condition information obtained by condition information obtainer 23B does not include the recording situation of the spoken voice.

Condition information obtainer 23B transmits the load control condition included in the obtained condition information to speaker feature obtainer 26A.

3.1.2.1.2 Similarity Calculator 25B

Based on the second speaker feature calculated by speaker feature obtainer 26A using the first speaker feature, similarity calculator 25B calculates, for each of registered speaker features stored in storage 24, a similarity between the registered speaker feature and the second speaker feature.

In the present variation, similarity calculator 25B calculates, for each of every registered speaker feature corresponding to conditions A, B, and C, etc., stored in storage 24, a similarity between the registered speaker feature and the second speaker feature obtained from speaker feature obtainer 26A.

3.2 Advantageous Effects, Etc.

As described above, according to Variation 2, the speaker recognition processing performed by information reception device 20B can be distributed and partially carried out by information transmission device 10B. Stated differently, by information transmission device 10B according to Variation 2 transmitting information to be used by information reception device 20B to recognize the speaker of the spoken voice, information reception device 20B can omit a portion of the computation for performing the speaker recognition processing.

More specifically, information transmission device 10B calculates the acoustic feature of the spoken voice, and from the calculated acoustic feature, calculates the first speaker feature, which corresponds to a portion of the speaker feature, and is a mid-calculation of the speaker feature.

Information transmission device 10A then transmits, as the information described above, the calculated first speaker feature and the load control condition indicating the first DNN used to calculate the first speaker feature, to information reception device 20B. With this, information reception device 20B can not only omit the calculation of the acoustic feature of the spoken voice of the speaker, but can omit a portion of the calculation of the speaker feature by using the first speaker feature as well. In other words, since information reception device 20B can omit a portion of the computation for performing the speaker recognition processing, the computational load for performing speaker recognition processing can be reduced.

Therefore, according to Variation 2, the computational load of the speaker recognition processing can be distributed, whereby the computational load required of information reception device 20B to perform the speaker recognition processing can be inhibited.

Hereinbefore, the information transmission device and the information reception device and the like according to an embodiment and variations thereof have been described, but the present disclosure is not limited to the above embodiment and variations.

For example, in the above embodiment and variations, the speaker to be recognized is exemplified as, but not limited to a human. The above subject matter still applies if the spoken voice of the speaker to be recognized is the voice of an animal other than a human. The above subject matter still applies even if the spoken voice of the speaker subject to recognition processing is extended to, for example, operating sounds of machinery or equipment, or normal or abnormal sounds of machinery or other equipment. In such cases, as the acoustic feature, instead of calculating, for example, MFCC, a fast Fourier transform (FFT) may be calculated for the sound corresponding to the spoken voice.

In the above variations, an example is given in which the configurations of the first DNN and the second DNN used to calculate the first speaker feature and the second speaker feature are fixed, but the present disclosure is not limited to this example. For example, the layers of the first DNN and the second DNN used to calculate the first speaker feature and the second speaker feature may be changed depending on the transmission load of network 3.

Each processing unit included in the information transmission device and the information reception device and the like according to the above embodiment and variations is typically achieved in the form of a large scale integrated (LSI) circuit. These processing units may be integrated into individual chips, or a portion or all of the processing units may be integrated into one chip.

Moreover, the method of circuit integration is not limited to LSI. Integration may be realized with a specialized circuit or a general purpose processor. A field programmable gate array (FPGA), which allows programming after LSI manufacturing, or a reconfigurable processor which allows reconfiguration of the connections and settings of circuit cells inside the LSI circuit may be used.

The present disclosure may also be realized as an information transmission method and an information reception method and the like performed by the information transmission device and the information reception device and the like, respectively.

Each element in each of the above embodiments may be configured in the form of an exclusive hardware product, or may be realized by executing a software program suitable for the element. Each element may be realized by means of a program executing unit, such as a CPU or a processor, reading and executing the software program recorded on a recording medium such as a hard disk or semiconductor memory.

The block diagrams illustrate one example of the division of functional blocks; a plurality of functional blocks may be realized as a single functional block, a single functional block may be broken up into a plurality of functional blocks, and part of one function may be transferred to another functional block. Moreover, a plurality of functional blocks which share similar functions can be processed by stand-alone hardware or software in parallel or by time-division.

The order in which the steps are executed in the flowcharts are mere examples presented for describing specific examples of the present disclosure; the steps may be executed in a different order. Moreover, some of the steps may be executed at the same time as (in parallel with) other steps.

Hereinbefore, the information transmission device and the information reception device and the like according to one or more aspects have been described based on an exemplary embodiment and variations thereof, but the present disclosure is not limited to the exemplary embodiment and the variations thereof. Various modifications of the exemplary embodiment and the variations thereof as well as embodiments resulting from arbitrary combinations of elements of different exemplary embodiments that may be conceived by those skilled in the art are included within the scope of one or more aspects of the present disclosure as long as they do not depart from the essence of the present disclosure.

INDUSTRIAL APPLICABILITY

The present disclosure can be used in an information transmission device, an information reception device, an information transmission method, a recording medium, and a system, and can be used in a teleconferencing system such as a telephone conferencing system.

The invention claimed is:

1. An information transmission device comprising:
an acoustic feature calculator that calculates an acoustic feature of a spoken voice;
a speaker feature calculator that calculates a speaker feature from the acoustic feature using a deep neural network (DNN), the speaker feature being a feature unique to a speaker of the spoken voice;
an analyzer that analyzes condition information indicating a condition to be used in calculating the speaker feature, based on the spoken voice; and
an information transmitter that transmits the speaker feature and the condition information to an information reception device that performs speaker recognition processing on the spoken voice, as information to be used by the information reception device to recognize the speaker of the spoken voice.

2. The information transmission device according to claim 1, wherein
the analyzer includes:
a situation analyzer that analyzes a recording situation of the spoken voice from the spoken voice; and
a condition information setter that sets the recording situation as the condition information.

3. The information transmission device according to claim 2, wherein
the recording situation indicates at least one of a noise level at a time of recording the spoken voice, a microphone used to record the spoken voice, or a data attribute of the spoken voice.

4. The information transmission device according to claim 2, wherein
the situation analyzer further analyzes a speaking duration of the spoken voice,
based on the speaking duration, the condition information setter further sets, as the condition information, a load control condition indicating that the DNN to be used by the speaker feature calculator is a first DNN, the first DNN being a portion of the DNN, the first DNN including first through $n^{th}$ layers of the DNN, where n is a positive integer, and
in accordance with the load control condition, the speaker feature calculator calculates a first speaker feature from the acoustic feature as the speaker feature using the first DNN, the first speaker feature being a mid-calculation of the speaker feature.

5. The information transmission device according to claim 1, wherein
the analyzer includes:
a situation analyzer that analyzes a speaking duration of the spoken voice; and
a condition information setter that, based on the speaking duration, sets, as the condition information, a load control condition indicating that the DNN to be used by the speaker feature calculator is a first DNN, the first DNN being a portion of the DNN, the first DNN including first through $n^{th}$ layers of the DNN, where n is a positive integer, and
in accordance with the load control condition, the speaker feature calculator uses the first DNN to calculate a first speaker feature from the acoustic feature as the speaker feature, the first speaker feature being a mid-calculation of the speaker feature.

6. An information reception device comprising:
a storage in which one or more registered speaker features, which are features unique to respective one or more registered speakers who are registered in advance, are stored per condition used to calculate the one or more registered speaker features;
a condition information obtainer that obtains the condition information included in the information transmitted from the information transmission device according to claim 1;
a speaker feature obtainer that obtains the speaker feature included in the information transmitted from the information transmission device;
a similarity calculator that calculates, for each of the one or more registered speaker features stored in the storage, a similarity between the registered speaker feature and the speaker feature, based on the condition information obtained by the information obtainer and the speaker feature obtained by the speaker feature obtainer; and
a speaker identifier that, based on the one or more similarities calculated by the similarity calculator, identifies and outputs which one of the one or more registered speakers stored in the storage the speaker of the spoken voice is.

7. The information reception device according to claim 6, wherein
the similarity calculator includes:
a selector that, when the condition information obtained by the condition information obtainer includes a recording situation of the spoken voice, selects the one or more registered speaker features of the one or more registered speakers that correspond to a condition that matches the recording situation; and
a similarity calculation processor that calculates, for each of the one or more registered speaker features selected by the selector, a similarity between the registered speaker feature and the speaker feature obtained by the speaker feature obtainer, wherein
based on the one or more similarities calculated by the similarity calculation processor, the speaker identifier identifies and outputs which one of the one or more registered speakers selected by the selector the speaker of the spoken voice is.

8. The information reception device according to claim 7, wherein
when the condition information obtained by the condition information obtainer further includes a load control condition indicating that a first DNN is used instead of the DNN, the condition information obtainer transmits the load control condition to the speaker feature obtainer, the first DNN being a portion of the DNN, the first DNN including first through $n^{th}$ layers of the DNN, where n is a positive integer, and
the speaker feature obtainer obtains a first speaker feature calculated using the first DNN as the speaker feature included in the information, and if the speaker feature obtainer has received the load control condition, calculates, based on the load control condition, a second speaker feature from the first speaker feature using a second DNN, the first speaker feature being a mid-calculation of the speaker feature, the second speaker feature being the speaker feature, the second DNN being a portion of the DNN, the second DNN including $n+1^{th}$ through final layers of the DNN.

9. The information reception device according to claim 6, wherein
when the condition information obtained by the condition information obtainer indicates a load control condition indicating that a first DNN is used instead of the DNN, the condition information obtainer transmits the load control condition to the speaker feature obtainer, the first DNN being a portion of the DNN, the first DNN including first through nth layers of the DNN, where n is a positive integer, and
the speaker feature obtainer obtains a first speaker feature calculated using the first DNN as the speaker feature included in the information, and if the speaker feature obtainer has received the load control condition, calculates, based on the load control condition, a second speaker feature from the first speaker feature using a second DNN, the first speaker feature being a mid-calculation of the speaker feature, the second speaker feature being the speaker feature, the second DNN being a portion of the DNN, the second DNN including n+1th through final layers of the DNN.

10. An information transmission method performed by a computer, the information transmission method comprising:
calculating an acoustic feature of a spoken voice;
calculating a speaker feature from the acoustic feature using a deep neural network (DNN), the speaker feature being a feature unique to a speaker of the spoken voice;
analyzing condition information indicating a condition to be used in calculating the speaker feature, based on the spoken voice; and
transmitting the speaker feature and the condition information to an information reception device that performs speaker recognition processing on the spoken voice, as information to be used by the information reception device to recognize the speaker of the spoken voice.

11. A non-transitory computer-readable recording medium having recorded thereon a program that causes a computer to execute the following:
calculating an acoustic feature of a spoken voice;
calculating a speaker feature from the acoustic feature using a deep neural network (DNN), the speaker feature being a feature unique to a speaker of the spoken voice;
analyzing condition information indicating a condition to be used in calculating the speaker feature, based on the spoken voice; and
transmitting the speaker feature and the condition information to an information reception device that performs speaker recognition processing on the spoken voice, as information to be used by the information reception device to identify the speaker of the spoken voice.

12. A system, comprising:
an information transmission device; and
an information reception device that performs speaker recognition processing, wherein
the information transmission device includes:
  an acoustic feature calculator that calculates an acoustic feature of a spoken voice;
  a speaker feature calculator that uses a deep neural network (DNN) to calculate a speaker feature from the acoustic feature, the speaker feature being a feature that can identify a speaker of the spoken voice;
  an analyzer that analyzes condition information indicating a condition to be used in calculating the speaker feature, based on the spoken voice; and
  an information transmitter that transmits the speaker feature and the condition information to the information reception device that recognizes the speaker of the spoken voice, as information to be used by the information reception device to recognize the speaker of the spoken voice, and
the information reception device includes:
  a storage in which one or more registered speaker features, which are features unique to respective one or more registered speakers who are registered in advance, are stored per condition used to calculate the one or more registered speaker features;
  a condition information obtainer that obtains the condition information included in the information transmitted from the information transmission device;
  a speaker feature obtainer that obtains the speaker feature included in the information transmitted from the information transmission device;
  a similarity calculator that calculates, for each the one or more registered speaker features stored in the storage, a similarity between the registered speaker feature and the speaker feature, based on the condition information obtained by the information obtainer and the speaker feature obtained by the speaker feature obtainer; and
  a speaker identifier that, based on the one or more similarities calculated by the similarity calculator, identifies and outputs which one of the one or more registered speakers stored in the storage the speaker of the spoken voice is.

* * * * *